(12) United States Patent
Curtis

(10) Patent No.: US 10,158,737 B2
(45) Date of Patent: *Dec. 18, 2018

(54) REAL TIME EVENT CAPTURE AND ANALYSIS OF TRANSIENT DATA FOR AN INFORMATION NETWORK

(71) Applicant: BANK OF AMERICA CORPORATION, Charlotte, NC (US)

(72) Inventor: Donald Steve Curtis, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 213 days.

This patent is subject to a terminal disclaimer.

(21) Appl. No.: 15/288,818

(22) Filed: Oct. 7, 2016

(65) Prior Publication Data

US 2018/0102935 A1    Apr. 12, 2018

(51) Int. Cl.
  *H04L 29/08* (2006.01)
  *H04L 12/26* (2006.01)

(52) U.S. Cl.
  CPC ........ *H04L 67/2804* (2013.01); *H04L 43/045* (2013.01)

(58) Field of Classification Search
  CPC ..................... H04L 67/2804; H04L 43/045
  See application file for complete search history.

(56) References Cited

U.S. PATENT DOCUMENTS

| | | | |
|---|---|---|---|
| 5,671,283 A | 9/1997 | Michener et al. | |
| 5,835,599 A | 11/1998 | Buer | |
| 6,148,338 A | 11/2000 | Lachelt et al. | |
| 6,324,286 B1 | 11/2001 | Lai et al. | |
| 6,658,393 B1 | 12/2003 | Basch et al. | |

(Continued)

FOREIGN PATENT DOCUMENTS

WO    2005081917 A2    9/2005

OTHER PUBLICATIONS

Bradley Hope et al., "A Bitcoin Technology Gets Nasdaq Test"; May 10, 2015; retrieved from http://www.wsj.com/articles/a-bitcoin-technology-gets-nasdaq-test-1431296886.

(Continued)

*Primary Examiner* — Michael A Keller
*Assistant Examiner* — Javier O Guzman
(74) *Attorney, Agent, or Firm* — Michael A. Springs; Moore & Van Allen PLLC; Peter B. Stewart

(57) ABSTRACT

Embodiments of the invention are directed to systems, methods, and computer program products for monitoring, identifying and correlating changes to transient event data as a plurality of technology events are processed by a plurality of applications. The proctor module of the system is automatically triggered by addition of event data to transient memory locations associated with the plurality of applications. The proctor module is configured to capture the transient multiple-attribute event data, in real-time, before the data is dequeued. The technology event processing module is configured to format, log and index the captured data from the proctor module. The system then maps an event/record of formatted data associated with a first transient memory location with a second event to another event of formatted data from a second transient memory location, and subsequently analyzes the multi-attribute data to identify changes.

20 Claims, 6 Drawing Sheets

(56) References Cited

U.S. PATENT DOCUMENTS

| | | | |
|---|---|---|---|
| 6,973,187 | B2 | 12/2005 | Gligor et al. |
| 7,055,039 | B2 | 5/2006 | Chavanne et al. |
| 7,092,400 | B2 | 8/2006 | Malzahn |
| 7,184,549 | B2 | 2/2007 | Sorimachi et al. |
| 7,362,859 | B1 | 4/2008 | Robertson et al. |
| 7,392,384 | B2 | 6/2008 | Hopkins et al. |
| 7,428,306 | B2 | 9/2008 | Celikkan et al. |
| 7,649,992 | B2 | 1/2010 | Raju et al. |
| 7,764,788 | B2 | 7/2010 | Tardo |
| 8,078,874 | B2 | 12/2011 | You et al. |
| 8,107,621 | B2 | 1/2012 | Celikkan et al. |
| 8,155,311 | B2 | 4/2012 | Shin et al. |
| 8,156,040 | B2 | 4/2012 | Gavin et al. |
| 8,259,934 | B2 | 9/2012 | Karroumi et al. |
| 8,296,232 | B2 | 10/2012 | Tullis et al. |
| 8,358,781 | B2 | 1/2013 | Schneider |
| 8,396,209 | B2 | 3/2013 | Schneider |
| 8,397,841 | B1 | 3/2013 | Griffo et al. |
| 8,412,605 | B2 | 4/2013 | Griffin et al. |
| 8,416,947 | B2 | 4/2013 | Schneider |
| 8,458,461 | B2 | 6/2013 | Tardo |
| 8,590,055 | B2 | 11/2013 | Yoon et al. |
| 8,606,705 | B2 | 12/2013 | Zanzot et al. |
| 8,606,706 | B2 | 12/2013 | Zanzot et al. |
| 8,737,606 | B2 | 5/2014 | Taylor et al. |
| 8,942,374 | B2 | 1/2015 | Fujisaki |
| 8,983,063 | B1 | 3/2015 | Taylor et al. |
| 9,059,866 | B2 | 6/2015 | Bar-Sade et al. |
| 9,906,447 | B2 * | 2/2018 | Oran ............... H04L 45/742 |
| 2002/0023053 | A1 | 2/2002 | Szoc et al. |
| 2003/0120586 | A1 | 6/2003 | Litty |
| 2003/0140007 | A1 | 7/2003 | Kramer et al. |
| 2003/0208440 | A1 | 11/2003 | Harada et al. |
| 2004/0153650 | A1 | 8/2004 | Hillmer |
| 2004/0153663 | A1 | 8/2004 | Clark et al. |
| 2004/0215560 | A1 | 10/2004 | Amalraj et al. |
| 2004/0245330 | A1 | 12/2004 | Swift et al. |
| 2005/0010524 | A1 | 1/2005 | Gutbrod et al. |
| 2005/0080701 | A1 | 4/2005 | Tunney et al. |
| 2006/0089905 | A1 | 4/2006 | Song et al. |
| 2006/0095364 | A1 | 5/2006 | Hamilton et al. |
| 2006/0116898 | A1 | 6/2006 | Peterson |
| 2006/0282660 | A1 | 12/2006 | Varghese et al. |
| 2007/0061260 | A1 | 3/2007 | deGroeve et al. |
| 2007/0162387 | A1 | 7/2007 | Cataline et al. |
| 2007/0168990 | A1 * | 7/2007 | Alshab ............ G06F 9/5038 717/127 |
| 2007/0174214 | A1 | 7/2007 | Welsh et al. |
| 2007/0198437 | A1 | 8/2007 | Eisner et al. |
| 2008/0015985 | A1 | 1/2008 | Abhari et al. |
| 2008/0077474 | A1 | 3/2008 | Dumas et al. |
| 2008/0103800 | A1 | 5/2008 | Domenikos et al. |
| 2008/0103972 | A1 | 5/2008 | Lanc |
| 2008/0140576 | A1 | 6/2008 | Lewis et al. |
| 2008/0195537 | A1 | 8/2008 | Schulz |
| 2008/0290181 | A1 | 11/2008 | Dimitri et al. |
| 2008/0294541 | A1 | 11/2008 | Weinflash et al. |
| 2008/0319922 | A1 | 12/2008 | Lawrence et al. |
| 2009/0106016 | A1 | 4/2009 | Dupray et al. |
| 2009/0248560 | A1 | 10/2009 | Recce et al. |
| 2009/0248573 | A1 | 10/2009 | Haggerty et al. |
| 2011/0066547 | A1 | 3/2011 | Clark et al. |
| 2011/0145657 | A1 * | 6/2011 | Bishop .............. G06F 11/3495 714/47.1 |
| 2013/0019008 | A1 * | 1/2013 | Jorgenson ............. H04L 41/12 709/224 |
| 2013/0185643 | A1 | 7/2013 | Greifeneder et al. |
| 2015/0172053 | A1 | 6/2015 | Schwarz et al. |
| 2015/0206106 | A1 | 7/2015 | Yago |
| 2016/0014027 | A1 * | 1/2016 | Oran ............... H04L 45/742 709/213 |
| 2018/0020021 | A1 * | 1/2018 | Gilmore ............. H04L 63/1458 |

OTHER PUBLICATIONS

European Patent Office Action for European Application No. 10 250 245.7-1955 dated May 6, 2013.
European Search Report for European Application No. EP 10 25 0246 completed May 27, 2010.
Extended European Search Report for European Application No. EP 10 25 0245 dated Jun. 1, 2010.
Guagliardo, Joseph C. et al., "Blockchain: Preparing for Disruption Like It's the '90s"; Mar. 14, 2016, retrieved from http://www.law360.com/articles/77120CVprint?section=ip.
Hope, Bradley et al., "A Bitcoin Technology Gets Nasdaq Test"; May 10, 2015; retrieved from http://www.wsj.com/articles/a-bitcoin-technology-gets-nasdaq-test-1431296886.
International Preliminary Report on Patentability and Written Opinion for PCT International Application No. PCT/US2010/058403 dated Jun. 5, 2012.
International Preliminary Report on Patentability and Written Opinion for PCT International Application No. PCT/US2010/058409 dated Jun. 5, 2012.
International Preliminary Report on Patentability and Written Opinion for PCT International Application No. PCT/US2010/058414 dated Jun. 5, 2012.
International Preliminary Report on Patentability dated Aug. 25, 2011 for PCT/US2010/024113.
International Preliminary Report on Patentability dated Aug. 25, 2011 for PCT/US2010/024123.
International Search Report and the Written Opinion of the International Searching Authority for International Application No. PCT/US2010/024123 dated Apr. 2, 2010.
International Search Report and the Written Opinion of the International Searching Authority for International Application No. PCT/US2010/024113 dated Apr. 12, 2010.
International Search Report and the Written Opinion of the International Searching Authority for International Application No. PCT/US2010/058380 dated Jan. 24, 2011.
International Search Report and the Written Opinion of the International Searching Authority for International Application No. PCT/US2010/058403 dated Jan. 24, 2011.
International Search Report and the Written Opinion of the International Searching Authority for International Application No. PCT/US2010/058414 dated Jan. 24, 2011.
International Search Report and the Written Opinion of the International Searching Authority for International Application No. PCT/US2010/058409 dated Jan. 31, 2011.
McMillian, Robert. "IBM Bets on Bitcoin Ledger"; Feb. 16, 2016, retrieved from http://www.wsj.com/articles/ibm-bets-on-bitcoin-ledger-1455598864.
Mexican Office Action for Mexico Application No. MX/a/2010/001717 dated Apr. 8, 2013.
Mexican Office Action for Mexico Application No. MX/a/2010/001718 dated May 29, 2012.
Popper, Nathaniel. "Bitcoin Technology Piques Interest on Wall Street"; Aug. 28, 2015 retrieved from http://www.nytimes.com/2015/08/31/business/dealbook/bitcoin-techno, Aug. 31, 2015.
Related U.S. Appl. No. 15/252,744, filed Aug. 31, 2016.
Related U.S. Appl. No. 15/252,761, filed Aug. 31, 2016.
Related U.S. Appl. No. 15/288,779, filed Oct. 7, 2016.
Related U.S. Appl. No. 15/288,835, filed Oct. 7, 2016.
Twesige, Richard Lee. "A simple explanation of Bitcoin and Blockchain technology"; Jan. 2015, retrieved from http://www.researchgate.net/profile/Richard_Twesige/publication/270287317_Bitcoin_A_simple_explanation_of_Bitcoin_and_Block_Chain_technology_JANUARY_2015_RICHARD_LEE_TWESIGE/links/54a7836f0cf267bdb90a0ee6.pdf.

* cited by examiner

REAL TIME EVENT CAPTURE AND ANALYSIS OF TRANSIENT DATA FOR AN INFORMATION NETWORK

BACKGROUND

Processing of electronic data files typically involves multiple processing stages. Systems for high volume data processing require multiple applications across various platforms running in order to implement the processing stages of electronic data. Typically, the event data in electronic files is transformed multiple times as technology processing is performed by a plurality of technology platform applications. This process, however, relies on transient memory locations to temporarily store the most current transformed event data after a processing stage at a particular technology application. This transient data is typically unavailable after the subsequent processing. Accordingly, it is difficult to monitor changes that occur to the perpetually altering event data during such processing stages. Therefore, a need exists for novel network architectures that provide monitoring of event data.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention comprise systems, methods, and computer program products that address these and/or other needs by providing an innovative system, method and computer program product for real time event capture and transformation of transient data for an information network. The system is configured to enable technology event data transformation, processing evaluation and data mapping. Typically the system comprises: a plurality of technology platform applications comprising an origination platform application and a processing platform application, wherein the origination platform application is associated with a first transient memory location configured to temporarily store data until the data is retrieved by the processing platform application, wherein the processing platform application is associated with a second transient memory location; a first proctor module application in operative communication with the first transient memory location, wherein the first proctor module application is configured to capture, in real time, transient data stored in the first transient memory location before the data is retrieved by the processing platform application; a second proctor module application in operative communication with the second transient memory location, wherein the second proctor module application is configured to capture, in real time, transient data stored in the second transient memory location; at least one memory device with computer-readable program code stored thereon; at least one communication device; at least one processing device operatively coupled to the plurality of technology platform applications, the first proctor module application and the second proctor module application, the at least one memory device and the at least one communication device. Executing the computer-readable code is configured to cause the at least one processing device to: receive, at the origination platform application, an origination electronic data file comprising a plurality of origination technology event records regarding processing of a plurality of technology activities, wherein each origination technology event record comprises a plurality of technology attributes associated with one of the plurality of technology activities; retrieve, by the origination platform application, the plurality of origination technology records from the origination electronic data file; position, by the origination platform application, a first origination technology event record of the plurality of origination technology records on a first transient data queue at the first transient memory location using an enqueue operation, wherein the first transient data queue is configured to temporarily store the first origination technology event record until the first origination technology event record is retrieved by the processing platform application; capture, by the first proctor module application, the first origination technology event record, wherein positioning the first origination technology event record on the first transient data queue is configured to trigger, automatically, the capture of the first origination technology event record by the first proctor module application, wherein capturing further comprises adding the captured origination technology event record to a first proctor queue; retrieve, by the processing platform application, the first origination technology event record from the first transient data queue at the first transient memory location using a dequeue operation; process, at the processing platform application, the first origination technology event record, turning the first origination technology event record to a first processed technology event record; position, by the processing platform application, the first processed technology event record on second transient data queue at the second transient memory location using an enqueue operation, wherein the second transient data queue is configured to temporarily store the first processed technology event record; capture, by the second proctor module application, the first processed technology event record, wherein positioning the processed technology event record on the second transient data queue is configured to trigger, automatically, the capture of the processed technology event record by the second proctor module application, wherein capturing further comprises adding the first captured processed technology event record to a second proctor queue; and map, the captured first origination technology event record to the captured first processed technology event record.

In some embodiments, or in combination with any of the previous embodiments, executing the computer-readable code is configured to further cause the at least one processing device to: retrieve, by a technology data logging application, a plurality of captured event records comprising the captured first origination technology event record and the captured first processed technology event record, from the first proctor queue and the second proctor queue; assign, at the technology data logging application, a first unique processing event identifier to the captured first origination technology event record and a second unique processing event identifier to the captured first processed technology event record; log, by the technology data logging application, the assigned first unique processing event identifier and origination event metadata comprising a predetermined portion of the plurality of technology attributes associated with the captured first origination technology event record, to a first event index memory location of an indexing module; and log, by the technology data logging application, the assigned second unique processing event identifier and processed event metadata comprising the predetermined portion of the plurality of technology attributes associated with the captured first processed technology event record, to a second event index memory location of the indexing module.

In some embodiments, or in combination with any of the previous embodiments, executing the computer-readable code is configured to further cause the at least one processing device to: write each of the plurality of the captured technology event records comprising the plurality of technology attributes to a native format event data location of an off-disk storage, in native format of the captured technology event record; and wherein the off-disk storage comprises a virtual tape.

In some embodiments, or in combination with any of the previous embodiments, executing the computer-readable code is configured to further cause the at least one processing device to transform the plurality of technology attributes associated with each of the plurality of the captured technology event records to a standard format, using an event standardization module.

In some embodiments, or in combination with any of the previous embodiments, mapping the captured first origination technology event record to the captured first processed technology event record further comprises: determining, for each of the plurality of captured event records comprising the first origination technology event record and the captured first processed technology event record, a processing event type, wherein the processing event type comprises a origination event record type and a processed event record type; based on determining that the captured first origination technology event record is the origination event record type, assigning a unique activity identifier to the captured first origination technology event record; based on determining that the captured first processing technology event record is the processed event record type, matching the captured first processed event record to the captured first origination technology event record, wherein mapping further comprises assigning the unique activity identifier of the mapped first origination technology event record to the first processed technology event record; and logging, for each mapped first origination technology event record and first processed technology event record, event metadata and the unique activity identifier associated with the mapped first origination technology event record and first processed technology event record to a matching index memory location of an indexing module; wherein the event metadata associated with the captured first origination technology event record comprises a predetermined portion of the plurality of technology attributes of the captured first origination technology event record; wherein the event metadata associated with the captured first processing technology event record comprises the predetermined portion of the plurality of technology attributes of the captured first processing technology event record.

In some embodiments, or in combination with any of the previous embodiments, wherein executing the computer-readable code is configured to further cause the at least one processing device to: write each of the mapped first origination technology event record and first processed technology event record comprising the plurality of technology attributes to a mapped event data location of an off-disk storage; wherein the off-disk storage comprises a virtual tape.

In some embodiments, or in combination with any of the previous embodiments, the predetermined portion of the plurality of technology attributes of the captured first origination technology event record comprises a predetermined portion of the plurality of technology attributes that are least likely to be modified during the processing of the technology event records by the processing platform application.

In some embodiments, or in combination with any of the previous embodiments, mapping the captured first origination technology event record to the captured first processed technology event record further comprises: creating a standardized first origination technology event record by transforming, the plurality of technology attributes associated with the captured first origination technology event record, to a standard format using an event standardization module; creating a standardized first processed technology event record by transforming, the plurality of technology attributes associated with the captured first processed technology event record, to the standard format using the event standardization module; determining, for each of a plurality of standardized technology event records comprising the standardized first origination technology event record and the standardized first processed technology event record, the event metadata comprising the predetermined first portion of the plurality of technology attributes that are least likely to be modified during the processing of the technology event records by the processing platform application; determining, for each of the plurality of standardized technology event records, a digital indicator for the event metadata associated with the technology event record; and matching the standardized first origination technology event record to the standardized first processed technology event record based on at least determining that the digital indicator of the standardized first origination event record matches the digital indicator of the standardized first processed event record.

In some embodiments, or in combination with any of the previous embodiments, determining the digital indicator for the event metadata comprises producing hash values of the event metadata using a hash function.

In some embodiments, or in combination with any of the previous embodiments, executing the computer-readable code is configured to further cause the at least one processing device to: receive, at a dynamic event data evaluation application, a request to determine whether the first processed technology event record was modified during the processing of the first processed technology event record by the first processing platform application; retrieve the logged event metadata and the unique activity identifier associated with the mapped first origination technology event record and processed first technology event record, from the matching index memory location of the indexing module; retrieve the mapped first origination technology event record and processed first technology event record from a mapped event data location of an off-disk storage, wherein the retrieved event records comprises retrieving the plurality of technology attributes associated with the with the mapped first origination technology event record and processed first technology event record, from the off-disk storage; and compare each of the technology attributes of the mapped first origination technology event record with the attributes of the first processed technology event record to determine any modification to technology attribute data.

In some embodiments, or in combination with any of the previous embodiments, executing the computer-readable code is configured to further cause the at least one processing device to: map, the captured first origination technology event record to the captured first processed technology event record; compare the captured first origination technology event record to the captured first processed technology event record to identify any modification to the origination technology event record; transmit the first processed technology event record to a data integrity checking application of the plurality of technology platform applications based on determining that the origination technology event record has not been modified; initiate the resource transfer activity based on receiving an indication of successful integrity check of the first processed technology event record, from the data integrity checking application.

Embodiments of the invention are further configured for real time event capture and analysis of transient data for an information network. In this regard, the invention provides systems, methods and computer program products that are configured to enable technology event data transformation, processing evaluation and data mapping. In some embodiments, or in combination with any of the previous embodiments, executing the computer-readable code is configured to further cause the at least one processing device to: receive, at a charting module, a plurality of captured technology event records, wherein each captured technology event record comprises a plurality of technology attributes, wherein the plurality of captured technology event records comprise a plurality of origination technology event records captured by the first proctor module from the first transient memory location, and a plurality of processed technology event records captured by the second proctor module from the second transient memory location; determine, for each of the plurality of captured technology event records, event metadata, wherein the event metadata comprises predetermined portion of the plurality of technology attributes; determine, for a captured first event record of the plurality of captured event records, a processing event type, wherein the processing event type comprises an origination event record type or a processed event record type, wherein the plurality of origination technology event records are associated with the origination event record type, wherein the plurality of processed technology event records are associated with the processed event record type; based on determining that the captured first technology event record is an origination event record type, assigning a unique activity identifier to the captured first origination technology event record; determine, for a captured second event record of the plurality of captured event records, the processing event type, wherein determining further comprise determining that the captured second technology event record is the processed event record type; matching the captured second technology event record to the captured first technology event record, based on determining that the event metadata of the captured first technology event record matches the event metadata of the captured second technology event record; and assigning the unique activity identifier of the captured first technology event record to the captured second technology event record.

In some embodiments, or in combination with any of the previous embodiments, executing the computer-readable code is configured to further cause the at least one processing device to transform the plurality of technology attributes associated with each of the plurality of the captured technology event records to a standard format, using an event standardization module.

In some embodiments, or in combination with any of the previous embodiments, determining that the event metadata of the captured first technology event record matches the event metadata of the captured second technology event record further comprises: transforming, the plurality of technology attributes associated with the captured first technology record and the captured second technology record, to a standard format using an event standardization module;

determining, for each of the captured first technology event and the captured second technology event, a digital indicator for the event metadata associated with the technology event record; and matching the captured second technology event record to the captured first technology event record based on at least determining that the digital indicator of the captured first technology event record matches the digital indicator of the captured second technology event record.

In some embodiments, or in combination with any of the previous embodiments, determining the digital indicator for the event metadata comprises producing hash values of the event metadata using a hash function.

In some embodiments, or in combination with any of the previous embodiments, mapping the captured first technology event record to the captured second technology event record further comprises: logging, for each of the matched first technology event record and second processed technology event record, the event metadata and the unique activity identifier associated with the mapped first technology event record and the second technology event record to a matching index memory location of an indexing module.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
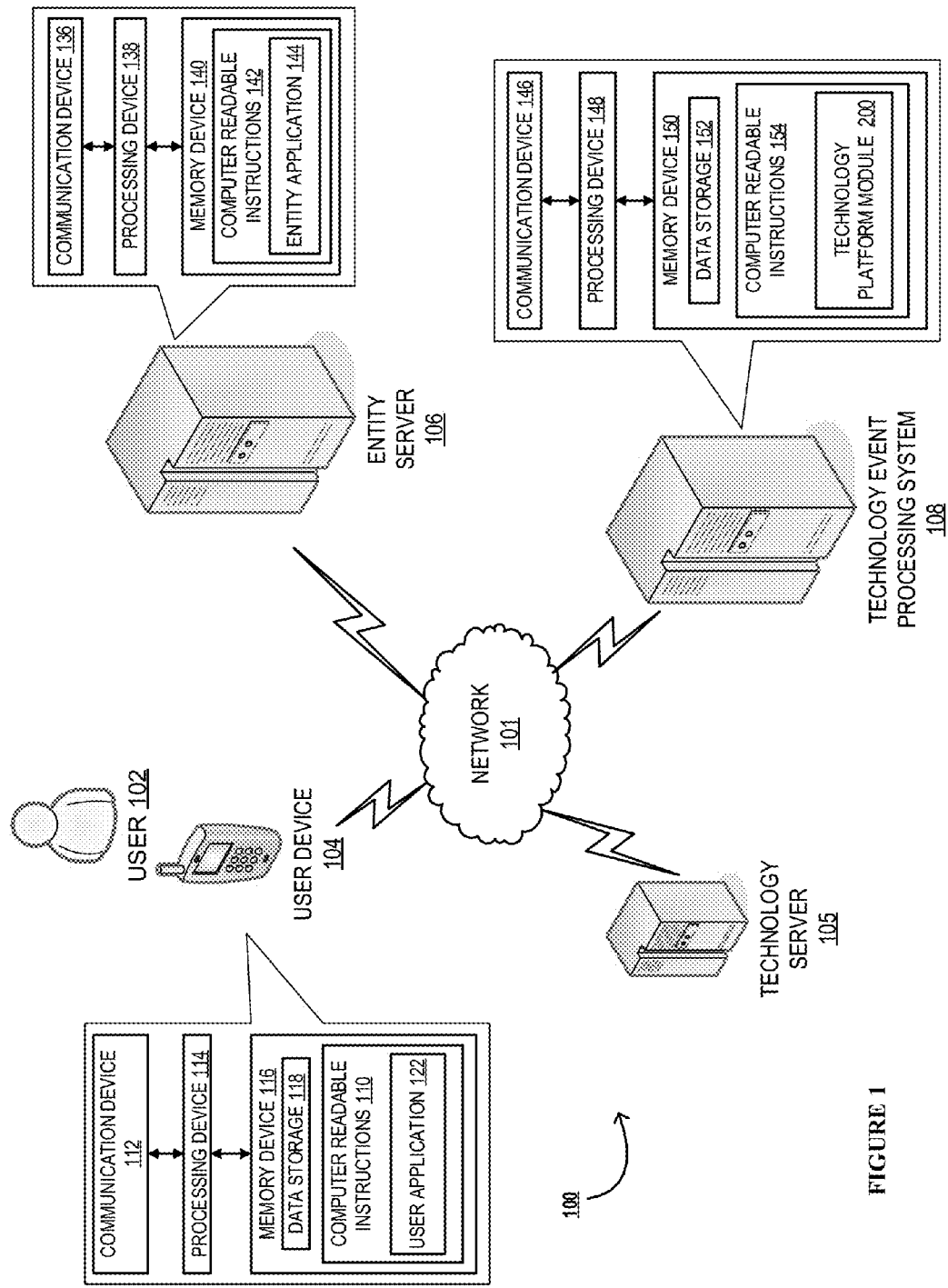
Figure 2:
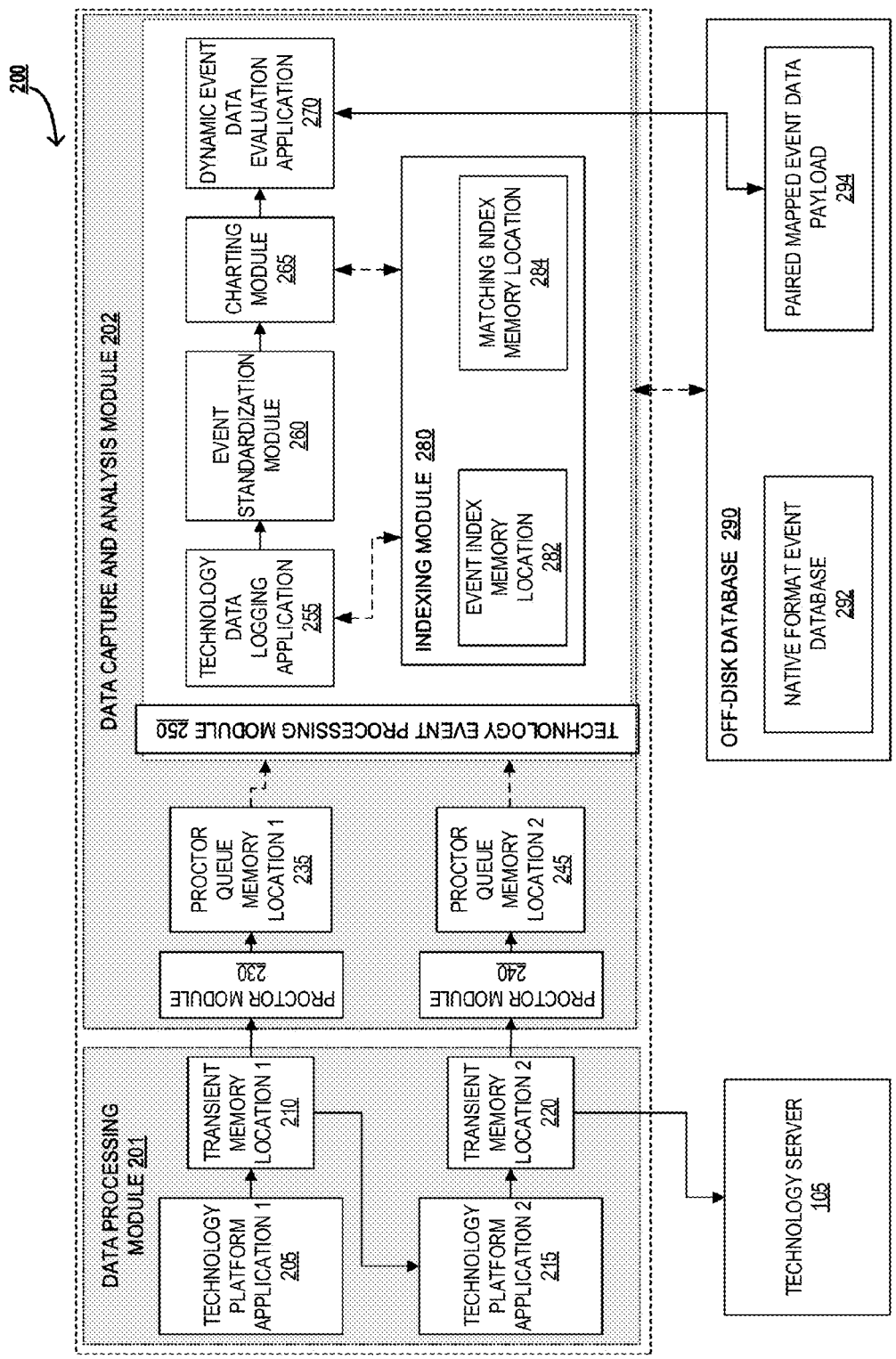
Figure 3:
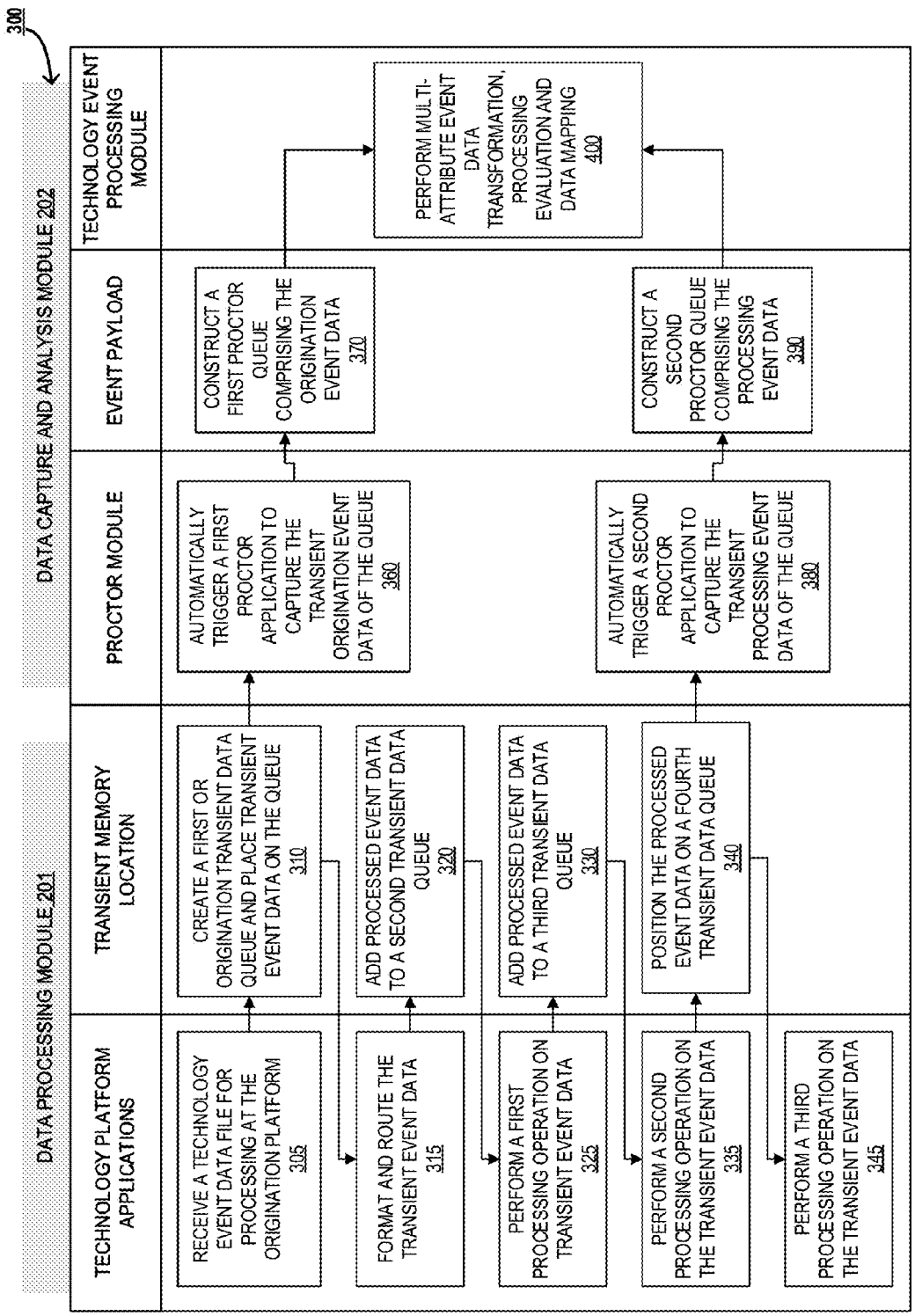
Figure 4:
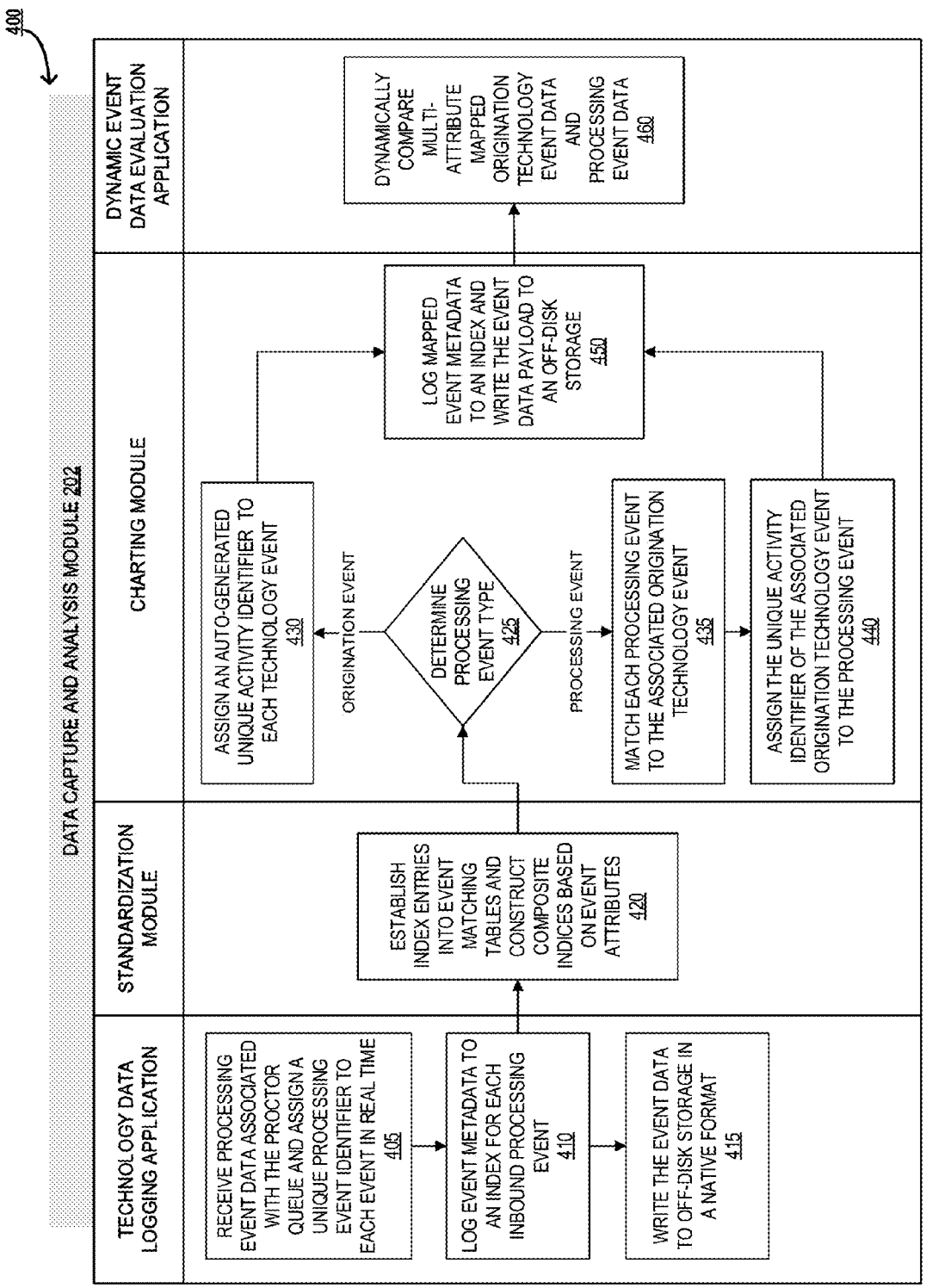
Figure 5:
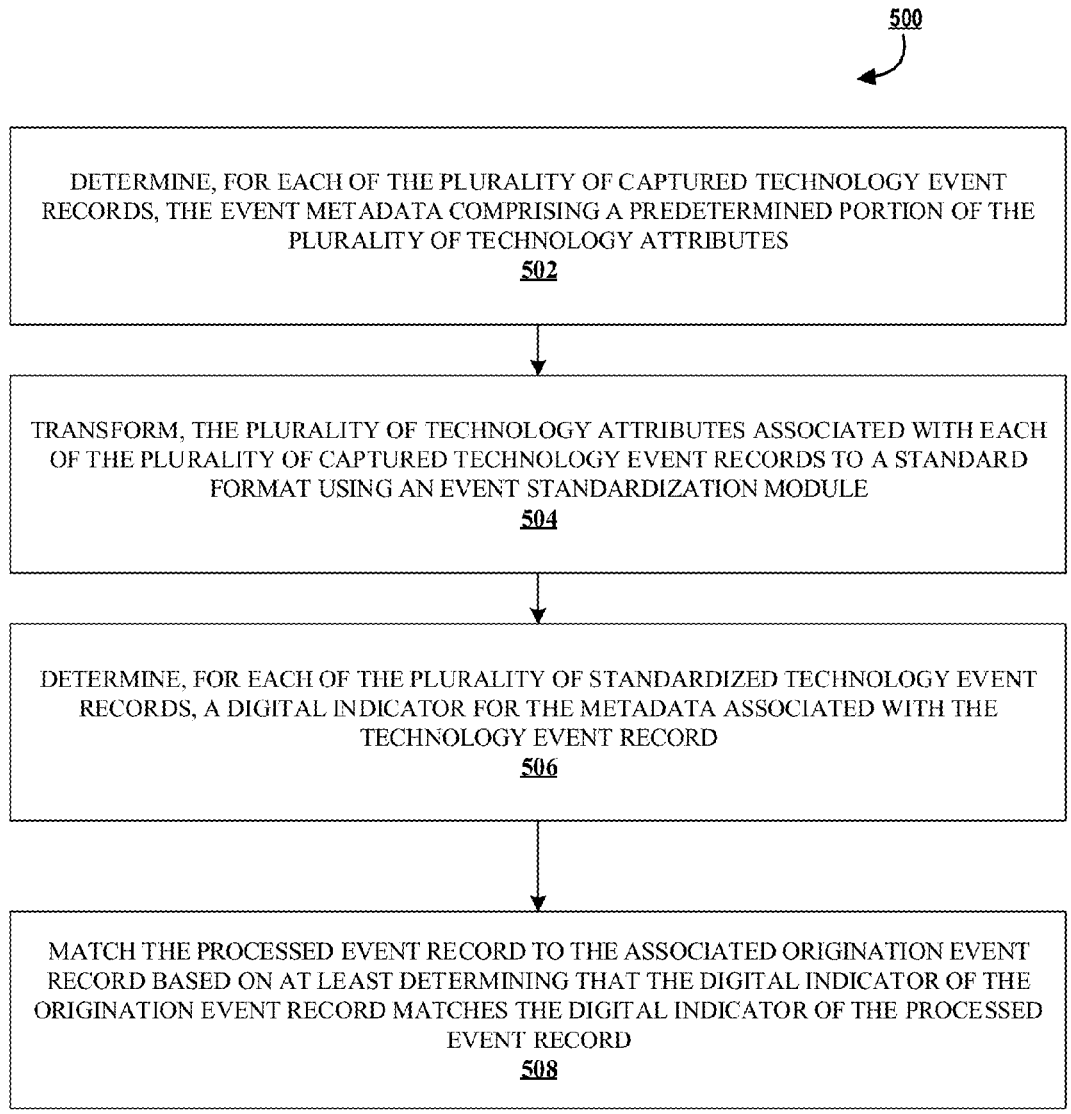
Figure 6:
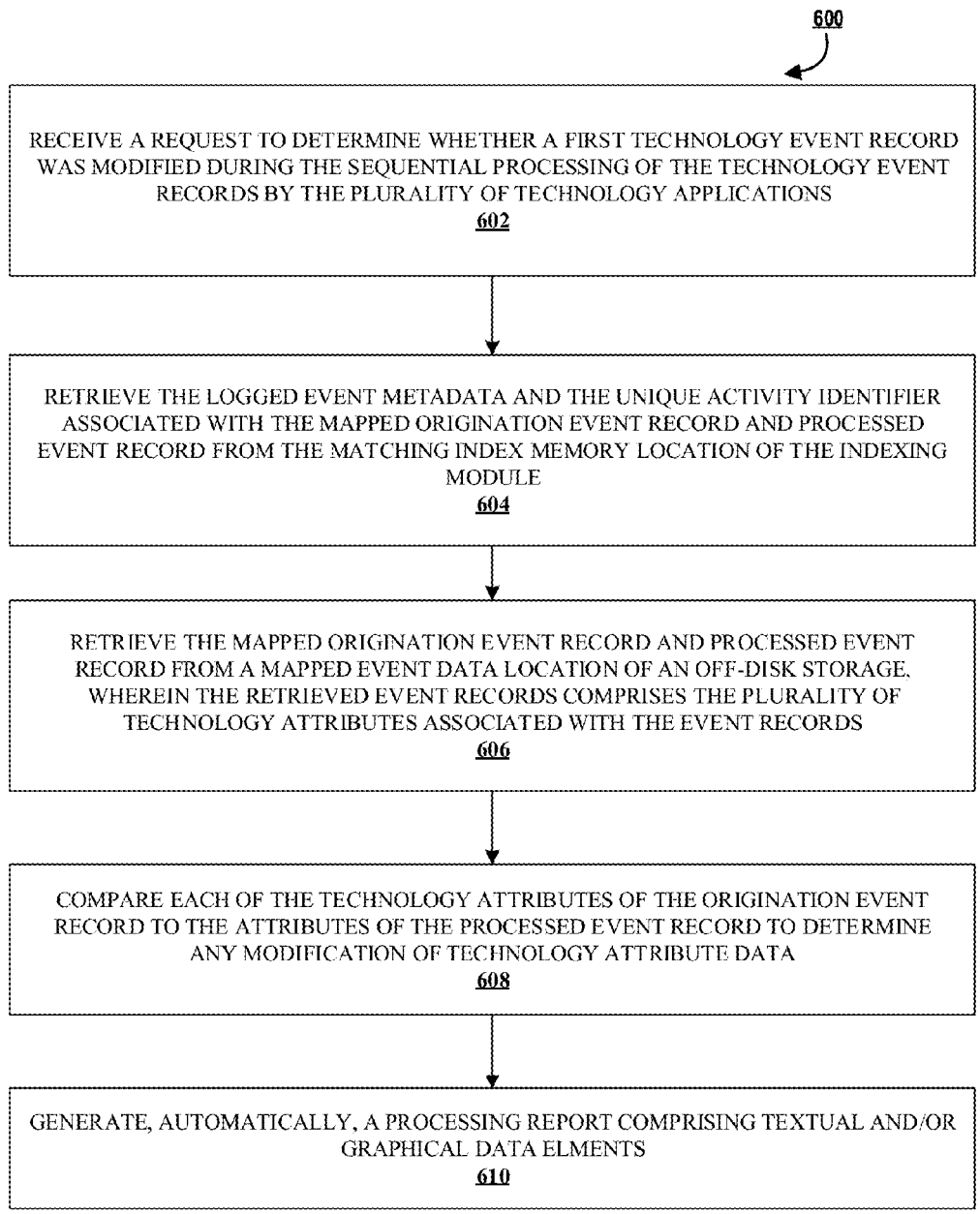

Having thus described embodiments of the invention in general terms, reference will now be made to the accompanying drawings, wherein:

FIG. 1 depicts a technology event processing system environment 100, in accordance with one embodiment of the present invention;

FIG. 2 depicts a technology platform module environment 200, in accordance with one embodiment of the present invention;

FIG. 3 depicts a process map 300 for processing of electronic data files, in accordance with one embodiment of the present invention;

FIG. 4 depicts a process map 400 for multi-attribute event data transformation and processing evaluation, in accordance with one embodiment of the present invention;

FIG. 5 depicts a high level process flow 500 for mapping of processing event record with the origination event records, in accordance with one embodiment of the present invention; and FIG. 6 depicts a high level process flow 600 for dynamically comparing multi-attribute record data and evaluating the processing of the data, in accordance with one embodiment of the present invention.

DETAILED DESCRIPTION OF EMBODIMENTS OF THE INVENTION

Systems for high volume data processing require multiple applications across various discrete technology platforms running in order to implement the processing stages of electronic data. Typically, processing of electronic data files across multiple distributed discrete technology platforms that are currently used in the large scale processing of electronic files requires a myriad of processes for data transmission, data reformatting, and substantial transformation of technology activity data stored in the electronic files and records. Typically, an electronic file comprising multiple records is processed sequentially by numerous technology applications via discrete technology processing events, with the most current data being transferred from one application to another, via transient memory locations. The data being transferred between applications is often transformed or re-formatted multiple times as a part of the processing itself or to be conductive for processing by the subsequent technology application and processing platform. This process, however, relies on transient memory locations to store the most current transformed event data after a processing event at a particular technology application. These transient memory locations typically comprise blocks of memory configured to temporarily store the transformed event data associated with various processing events of applications as they are received. These transient memory locations may be configured, as in the case of the present invention, to store transient processing/processed event data in suitable data structures such as queues, stacks or linked lists. The current transient data in a transient memory location is overwritten, dequeued, or otherwise deleted, and as such is unavailable once the data is transferred to the next technology application for further processing, to allow for event data associated with the newer/other files being processed to be stored in these locations.

Typically, the event data in the received electronic files is transformed multiple times as the technology processing is performed by a plurality of technology platform applications. In this regard, the final transformed record data often does not resemble the initial record data in the received electronic file with respect to the associated format, programing language, syntax and/or attributes. Hence, determining whether the underlying data in the transformed record has substantially changed is extremely difficult. As such, data alterations at any of the technology applications, such as processing errors, may be multiplied/built on by subsequent applications, and may be virtually undetectable until the data record is subsequently rejected or is not able to be processed downstream. Accordingly, it is desirable to identify the various data transformation events and the associated modifications to the data to ascertain the stage, type, and technology application associated with such modifications. However, the intricacy of the processing operations via multiple technology applications and platforms, the sheer volume of electronic files being processed at a given time and the continual transformation of transient event data that is only available temporarily at transient memory locations before being overwritten, make it very difficult to track the processing of electronic files and the associated record data themselves, much less determining the processing of specific records of the files, determining the status and content of the data within them at each processing stage/ event, and the specific data modification performed by each technology applications. As such, detection of the source of data modification such as errors, and performing any required corrections is desirable.

For instance, a data processing system that is configured to process records associated with electronic purchase orders may receive about 2000 or more order records per minute for real-time processing, from a plurality of external systems. Because these external systems may operate on different platforms, operating systems, technical languages and character sets, the various records received at the data processing system may be different from one another in their structure, format, syntax, technical language, character sets and other aspects, such as XML (Extensible Markup Language) format, EBCDIC (Extended Binary Coded Decimal Interchange Code) format, and the like. Each record may comprise a plurality of attributes or data fields comprising data such as, product codes, product details (quantity, one or more product specification parameters, vendor details, shipping details, user gift messages), purchase details (financial account identifiers and other details), user details (shipping addresses, loyalty program information, and the like), shipping details (timeline, routing details, transport details and the like), inventory details (warehouse information, and the like), or the like. Although, at each processing stage, the associated technology application/platform may operate on only a portion of the attributes, the rest of the attributes would also be required to be processed for subsequent operations by other downstream applications and for transmission to an end user system after the completion of processing. As discussed previously, the processed record data is transient and is transmitted from one application/ platform to another via transient memory locations. Because the data is continually transformed and is only temporarily available, in the event of failure of the processing of a record, it is very difficult to determine the specific transformation performed at each processing stage, much less identify a potential cause and undertake remedial actions.

Furthermore, these concerns are exacerbated in applications involving financial transactions, where each electronic file may comprise hundreds, thousands or tens of thousands of records, each record representing an electronic financial transaction, where real-time determination of the status of the transaction processing, content of the modified transaction records at the transient memory location, and determination of the source of any data modifications in the data processing, and subsequent correction for the completion of the financial transaction, is desired. Determining the particular stage of processing (for example, determining a current technology application processing the record), and determining the content of the records through the multiple data processing events of numerous applications, in real-time, is not practical in existing systems. As discussed previously, particularly in the case of current financial data processing environments, the complexity of the data staging and movement activities, and the transient nature of the modified data hinders tracking and determining status and content of electronic files being processed at real time or near real-time for each and every activity, and/or mapping the modified data through the different transaction stages for the payment transactions the entity performs. Furthermore, data modifications in financial transaction record processing may hinder the processing all together. The present invention alleviates the above concerns and is directed to providing a novel technical solution that relates to monitoring, identifying and correlating changes to transient data as a plurality of technology records are processed by a plurality of applications, without increasing the processing time of the record (typically about one second) and without modifying platform applications, as will be described in detail in this disclosure.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

In some embodiments, an "entity" or "enterprise" as used herein may be any institution employing information technology resources and particularly technology infrastructure configured for large scale processing of electronic files, electronic technology event data and records, and performing/processing associated technology activities. In some instances, the entity's technology systems comprise multiple technology applications across multiple distributed technology platforms for large scale processing of technology activity files and electronic records. As such, the entity may be any institution, group, association, financial institution, establishment, company, union, authority or the like, employing information technology resources.

As described herein, a "user" is an individual associated with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer. In other embodiments, a user may be a system performing one or more tasks described herein.

In the instances where the entity is a financial institution, a user may be an individual or entity with one or more relationships affiliations or accounts with the entity (for example, a financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably. A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, a non-monetary user profile that includes only personal information associated with the user, or the like. The technology resource is typically associated with and/or maintained by an entity.

As used herein, a "user interface" may be a graphical user interface. Typically, a graphical user interface (GUI) is a type of interface that allows users to interact with electronic devices such as graphical icons and visual indicators such as secondary notation, as opposed to using only text via the command line. That said, the graphical user interfaces are typically configured for audio, visual and/or textual communication. In some embodiments, the graphical user interface may include both graphical elements and text elements. The graphical user interface is configured to be presented on one or more display devices associated with user devices, entity systems, processing systems and the like.

As discussed previously, each "electronic data file" or "technology event data file" or a "data file" often comprises multiple technology event records (for example, hundreds, thousands or tens of thousands of technology event records). Each technology event record may comprise multiple data elements or attributes containing electronic data regarding one or more aspects of an electronic/technology activity. In some instances, each technology event record may comprise technology elements associated with type of activity, instructions for processing the event record, technology resources involved, information associated with the users/entities/systems involved, technology platform applications involved, processing events associated with each technology application, activity attributes, time, location, person/system that initiated/performed the activity, and/or other aspects. Furthermore, the technology elements may by discrete components of the record, or the technology elements may merely refer to one or more portions of a single data component in a record. Although referred to as "a technology event record", it is understood that, in some embodiments each activity may be associated with multiple technology event records.

For example, in the instances where the electronic data files comprise financial information, each electronic data file may comprise multiple technology event records, with each technology event record being associated with an electronic activity comprising a financial activity/transaction. Furthermore, each record may comprise one or more technology elements associated with type of activity (for example, debit, credit, resource transfer), instructions for processing the record (for example, type of processing), technology resources involved (for example, initiating resource/financial institution, receiving resource or financial institution, intermediate resource systems, domestic systems, international systems), technology platforms applications involved (for example, technology data processing applications, regulatory applications, internal applications), information associated with the users/entities/systems involved (for example, initiating or first user name, first user account identifiers, receiving or second user name, second user account identifiers), activity attributes (for example, resource quantity/amount, inbound and outbound currency), timestamp, and/or other aspects.

An electronic activity, also referred to as a technology activity, such as a "resource transfer" or "transaction," may refer to any activities or communication between a user or entity and the financial institution, activities or communication between multiple entities, communication between technology applications and the like. A resource transfer may refer to a payment, processing of funds, purchase of goods or services, a return of goods or services, a payment transaction, a credit transaction, or other interactions involving a user's account. In the context of a financial institution, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A resource transfer may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances such as paychecks; loading money onto stored value cards (SVCs) and/or prepaid cards; donating to charities; and/or the like.

As discussed previously, embodiments of the present invention alleviate the deficiencies of existing systems and achieve other advantages by providing apparatuses (e.g., a system, computer program product and/or other devices) and methods for real time event capture, and transformation of transient data for an information network. Furthermore, the present invention enables real-time tracking of processing activities performed on individual records and the data contained therein, by capturing and mapping event data using proctor modules, without requiring replacement or modification of existing data processing applications and without slowing down the processing of the record. Specifically, the present invention is embodied in technology apparatuses (e.g., a system, computer program product and/or other devices) and methods for establishing existing technology applications and/or other technology applications and/or platforms in a technology processing system environment for real time event capture, analysis, transformation and charting of transient data in an information network. Accordingly, the novel technology event processing system provides a technical improvement over existing data processing systems, because the present invention allows for dynamic capture, comparison, mapping and analysis of transient event data, in real-time, without any increases in processing time and speeds of record processing.

FIG. 1 illustrates a technology event processing system environment 100, in accordance with one embodiment of the present invention. As illustrated in FIG. 1, a technology event processing system 108 is operatively coupled, via a network 101 to a user device 104, to an entity server 106, and to a technology server 105. In this way, the technology event processing system 108 can send information to and receive information from the user device 104, the entity server 106 and the technology server 105. FIG. 1 illustrates only one example of an embodiment of the system environment 100, and it will be appreciated that in other embodiments one or more of the systems, devices, or servers may be combined into a single system, device, or server, or be made up of multiple systems, devices, or servers. In this way, the technology platform module 200 of the technology event processing system 108, a network of comprising technology platform applications, is configured to process, index, chart and evaluate one or more electronic files and the associated technology event records, and perform the associated technology activities.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 may be one or more individuals or entities that may either provide the electronic files for processing, desire access to at least a portion of the technology event data associated with the electronic files or records that have either been processed or are being processed, and/or the request access to data associated with the technology activities associated with the event records. As such, in some embodiments, the user 102 may be associated with the entity and/or a financial institution that may desire one or more data points associated with the processing of electronic files associated with the technology event processing system for payment or global payment processing.

FIG. 1 also illustrates a user system 104. The user device 104 may be, for example, a desktop personal computer, a mobile system, such as a cellular phone, smart phone, personal data assistant (PDA), laptop, or the like. The user device 104 generally comprises a communication device 112, a processing device 114, and a memory device 116. The user device 104 is typically a computing system that is configured to enable user and device authentication for access to technology event data. The processing device 114 is operatively coupled to the communication device 112 and the memory device 116. The processing device 114 uses the communication device 112 to communicate with the network 101 and other devices on the network 101, such as, but not limited to, the entity server 106, the technology event processing system 108 and the technology server 105. As such, the communication device 112 generally comprises a modem, server, or other device for communicating with other devices on the network 101.

The user device 104 comprises computer-readable instructions 110 and data storage 118 stored in the memory device 116, which in one embodiment includes the computer-readable instructions 110 of a user application 122. In some embodiments, the technology event processing system 108 and/or the entity system 106 are configured to cause the processing device 114 to execute the computer readable instructions 110, thereby causing the user device 104 to perform one or more functions described herein, for example, via the user application 122 and the associated user interface.

As further illustrated in FIG. 1, the technology event processing system 108 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device, such as the processing device 148, typically includes functionality to operate one or more software programs and technology platform applications based on computer-readable instructions thereof, which may be stored in a memory device, for example, executing computer readable instructions 154 or computer-readable program code 154 stored in memory device 150 to perform one or more functions associated with a technology platform module 200

The processing device 148 is operatively coupled to the communication device 146 and the memory device 150. The processing device 148 uses the communication device 146 to communicate with the network 101 and other devices on the network 101, such as, but not limited to the entity server 106, the technology server 105 and the user system 104. As such, the communication device 146 generally comprises a modem, server, or other device for communicating with other devices on the network 101.

As further illustrated in FIG. 1, the technology event processing system 108 comprises the computer-readable instructions 154 stored in the memory device 150, which in one embodiment includes the computer-readable instructions 154 of the technology platform module 200. In some embodiments, the computer readable instructions 154 comprise executable instructions associated with technology platform applications, proctor modules, memory locations, technology event processing module and/or its components, associated with the technology platform module 200, wherein these instructions, when executed, are typically configured to cause the applications or modules to perform/execute one or more steps described herein. In some embodiments, the memory device 150 includes data storage 152 for storing data related to the system environment, but not limited to data created and/or used by the technology platform module 200. The technology platform module 200 is further configured to perform or cause other systems and devices to perform the various steps in processing electronic records, as will be described in detail later on.

As such, the processing device 148 is configured to perform some or all of the data processing and event capture, transformation and analysis steps described throughout this disclosure, for example, by executing the computer readable instructions 154. In this regard, the processing device 148 may perform one or more steps singularly and/or transmit control instructions that are configured to cause technology platform applications, proctor modules, event processing modules, entity server 106, user device 104, and technology server 105 and/or other systems and applications, to perform one or more steps described throughout this disclosure. Although various data processing steps may be described as being performed by technology platform applications, proctor modules, memory locations, technology event processing module and/or its components and the like in some instances herein, it is understood that the processing device 148 is configured to establish operative communication channels with and/or between these modules and applications, and transmit control instructions to them, via the established channels, to cause these module and applications to perform these steps.

Embodiments of the technology event processing system 108 may include multiple systems, servers, computers or the like maintained by one or many entities. FIG. 1 merely illustrates one of those systems 108 that, typically, interacts with many other similar systems to form the information network. In one embodiment of the invention, the technology event processing system 108 is operated by the entity associated with the entity server 106, while in another embodiment it is operated by a second entity that is a different or separate entity from the entity server 106. In some embodiments, the entity server 106 may be part of the technology event processing system 108. Similarly, in some embodiments, the technology event processing system 108 is part of the entity server 106. In other embodiments, the entity server 106 is distinct from the technology event processing system 108.

In one embodiment of the technology event processing system 108, the memory device 150 stores, but is not limited to, the technology platform module 200 comprising the technology platform applications and the technology event processing module, as will be described later on with respect to FIG. 2. In one embodiment of the invention, the technology platform module 200 may associate with technology platform applications having computer-executable program code that instructs the processing device 148 to operate the network communication device 146 to perform certain communication functions involving the technology server 105, the user device 104 and/or the entity server 106, as described herein. In one embodiment, the computer-executable program code of an application associated with the technology platform module 200 may also instruct the processing device 148 to perform certain logic, data processing, and data storing functions of the application.

The processing device 148 is configured to use the communication device 146 to receive data, such as electronic data files comprising technology event records, receive requests for processing status and processed event data, transmit processed event data and the like. In some instances, the processing device 148 stores the data that it receives in its native format in the memory device 150, for example, in an off-disk database associated with the data storage 152, described in detail with respect to FIG. 2.

In the embodiment illustrated in FIG. 1 and described throughout much of this specification, the technology platform module 200 may perform one or more of the functions described herein, by the processing device 148 executing computer readable instructions 154 and/or executing computer readable instructions associated with one or more technology platform applications.

As illustrated in FIG. 1, the entity server 106 is connected to the technology event processing system 108 and may be associated with a financial institution network. In this way, while only one entity server 106 is illustrated in FIG. 1, it is understood that multiple network systems may make up the system environment 100 and be connected to the network 101. The entity server 106 generally comprises a communication device 136, a processing device 138, and a memory device 140. The entity server 106 comprises computer-readable instructions 142 stored in the memory device 140, which in one embodiment includes the computer-readable instructions 142 of an institution application 144. The entity server 106 may communicate with the technology event processing system 108. The technology event processing system 108 may communicate with the entity server 106 via a secure connection generated for secure encrypted communications between the two systems for communicating data for processing across various applications.

As further illustrated in FIG. 1, in some embodiments, the technology event processing system environment 100 further comprises a technology server 105, in operative communication with the technology event processing system 108, the entity server 106, and/or the user device 104. Typically, the technology server 105 comprises a communication device, a processing device and memory device with computer readable instructions. In some instances, the technology server 105 comprises one or more data processing applications configured for downstream processing event records associated with the electronic files received from the technology event processing system. These applications may be operated by the processor executing the computer readable instructions associated with the technology server 105, as described previously. In some instances, the technology server 105 is owned, operated or otherwise associated with third party entities, while in other instances, the technology server 105 is operated by the entity associated with the systems 108 and/or 106. Although a single external technology server 105 is illustrated, it should be understood that, the technology server 105 may represent multiple technology servers operating in sequentially or in tandem to perform one or more data processing operations.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 illustrates the technology platform module environment 200 for real time event capture, transformation and analysis of transient data associated with the information network 101. In some embodiments, computer readable instructions 154, when executed by the processing device 148 of the technology event processing system 108 (hereinafter referred to as "the system"), are typically configured to cause the modules, applications, and other components of the technology platform module environment 200 to perform one or more functions as described herein. The technology platform module 200 typically comprises a data processing module 201 comprising a plurality of processing applications and associated transient memory locations as described below. The data processing module 201 of an entity, and specifically the technology platform applications are configured to process records associated with electronic data files, such as electronic product orders, financial resource transfers or payment transfers and the like. As discussed previously, each electronic data file or technology event data file typically comprises multiple technology event records (for example, hundreds, thousands or tens of thousands of technology event records). Each technology event record typically further comprises multiple data elements or attributes containing attribute data regarding an electronic/technology activity (such as a resource transfer activity). Typically, once the electronic file (such as an electronic file related to resource transfer activities) is received for processing, the electronic file is fragmented and associated technology event records are processed individually, separate from the electronic file. The event data in each of the technology event records is typically transformed by a plurality of technology platform applications, in order to perform the technology activity associated with the record.

In this regard, the technology platform module 200 typically comprises multiple technology platform applications, such as a technology platform application 1 (205), a technology platform application 2 (215), to execute the specific data processing operations. The technology platform module 200 may further comprise technology platform applications 3, 4, ... and so on (not illustrated), wherein each technology platform application is configured to perform at least one processing operation (also referred to as a processing event) on the technology event records. As illustrated, the technology platform applications are typically configured to process the technology event records in a sequential manner, although in some embodiments two or more technology platform applications may process the records in tandem. The technology platform applications are typically configured to process the event records in a series of processing events, each processing event typically resulting in processed data or processing event data. Processing of the technology event records comprises modifying the event data by transforming the associated event data, formatting the event data and the like, for the completion of the processing event at the technology application and/or for ensuring compatibility with the succeeding technology application. In this regard, the format, programming language, character set, syntax and the like of record data in one or more attributes of the event records are modified as the data is processed by a technology platform application to execute the associated processing event. As discussed previously, format, programming language, character set and/or syntax, of the event records are successively modified/transformed by the technology platform applications. These modifications may comprise modifications performed by the technology platform applications while the records are processed by the applications, inadvertent data alterations caused by the technology applications, middleware or other components, and/or data alterations performed by one or more users using the technology applications or other components. In some instances, the data modifications performed by the technology applications and data alterations by users/personnel are necessary and required for processing and/or are often unavoidable, while the data alterations comprising processing errors by applications, or inadvertent alterations by personnel are often undesirable. Although, in some instances, alteration of the data content of records by either the system components/applications or the users, i.e., the record data contained in the one or more attributes may be undesirable and hence eschewed.

As further illustrated by FIG. 2, each technology platform application is associated with a transient memory location. Although two transient memory locations (210, 220) are illustrated, it is understood that the technology platform module 200 may further comprise other transient memory locations associated with any additional technology platform applications (3, 4, ... ) that the module may comprise. As such, each technology platform application is configured to store processed event records in a transient data queue, or another suitable data structure, in the transient memory location for retrieval by the subsequent processing by another technology platform application. The transient data queue is implemented using a suitable data structure such as a linked list or a doubly linked list. The transient data queue is associated with a queue type, chosen based on the associated technology platform application. The queue types comprise a linear queue, a priority queue, a circular queue, a double-ended queue and the like. Furthermore, the transient data queue is configured for enqueuing or enqueue operations, i.e. addition of event records to the queue at a rear terminal position of the queue as the processed records are received from the preceding technology application, and dequeuing or dequeue operations, i.e. removal of event records from a front terminal position of the queue when the records are retrieved by a succeeding technology application for further processing. The configuration of rear terminal position and the front terminal position typically varies based on the queue type. Although termed as a data queue, it is understood that other data structures such as stacks may also be employed.

As such the transient memory locations are configured to store processed event data associated with the records being processed, temporarily until the records are retrieved by succeeding technology platform applications using a dequeue operation. The dequeue operation may comprise deletion of data from the data queue, overwriting of the event data with other event records, and the like, once the record is retrieved by the succeeding technology application. As such, in some embodiments, the transient memory location is implemented in a fixed memory location in physical memory hardware, such as the physical storage medium of memory device 150. In other embodiments, the transient memory location is implemented by using a virtual data buffer in software, pointing at a location in the physical memory, such as the physical storage medium of memory device 150. In some embodiments, the data queues at transient memory locations are operated using RAM to temporarily store the event record data for quicker access and retrieval, although hard disk drives may also be employed. In some instances, after completion of the processing by the technology platform applications, the processed records are transmitted to the technology server 105, for any further operations. As discussed previously, because the transformed event data associated with the processing events at the technology platform applications is only temporarily available at the transient memory locations, it is extremely difficult and often not possible to track the processing of the records, much less analyze, compare and chart the processed event data at the various processing events of the technology platform applications, using solely the technology platform applications and the transient memory locations. The present invention provides a novel solution by implementing proctor modules and a technology event processing module that alleviate the aforementioned concerns without increasing the processing time or processing speed of the records. Furthermore, the proctor modules and the technology event processing module may be integrated with existing technology platform applications in an information network, without requiring modifications to the existing application structures.

As illustrated by FIG. 2, the technology platform module 200 further comprises a data capture and analysis module 202 for real-time capture, analysis and mapping of transient event data of the data processing module 201. As such, the data capture and analysis module 202 described herein is configured to capture, analyze and chart processing of event records of any particular data processing module 201 of an entity. The data capture and analysis module 202 can be easily configured and operatively coupled to an existing data processing module 201, with minimal or no modifications to the data processing module 201 and/or the data capture and analysis module 202. The data capture and analysis module 202 typically comprises one or more proctor modules associated with the transient memory locations. The proctor modules are configured for real time capture of event data as the event records undergo processing events at various technology platform applications. Typically, the technology platform module 200 comprises at least two proctor modules. The proctor modules are typically employed at transient memory locations, whose processed record data is required to be analyzed or charted. For instance, FIG. 2 illustrates a proctor module 230 associated with transient memory location 210 and a proctor module 240 associated with the transient memory location 220. However, the technology platform module may comprise additional proctor modules associated with other transient memory locations (3, 4, . . . ). Furthermore, each proctor module is typically associated with a downstream proctor queue memory location. For instance, FIG. 2 illustrates a proctor queue memory location 1 (235) associated with the proctor module 230 and proctor queue memory location 2 (245) associated with the proctor module 240.

As such, the proctor module (230, 240, . . . ) is configured to capture the event data in the transient data queues of the associated transient memory location (210, 220, . . . ), in real-time, and store the replicated data in an associated proctor queue memory location (235, 245, . . . ). Capturing the transient data queue comprises replicating each of the processed event records as they are added to the transient data queue, in real time or near real time after the enqueue operations, and before the dequeue operations. Typically, the proctor module (230, 240, . . . ) is configured such that addition of data to the associated transient memory location automatically triggers the proctor module for data replication, in real time, without requiring transmission of additional instructions. In some embodiments, the proctor module comprises a daemon program such as a unix daemon program, configured for replicating the event data in the transient data queues and storing the replicated data in the associated proctor queue memory location. Furthermore, in some embodiments, the proctor queue memory locations are transient memory locations, similar to those described previously, that are configured to store the replicated data (for example, in transient data queues) until it is transmitted to, or retrieved by the technology event processing module 250.

The technology platform module 200, and the data capture and analysis module 202 in particular, further comprises a technology event processing module 250 in operative communication with the proctor modules and the proctor queue memory locations. The technology event processing module 250 is configured for transformation, analysis and reporting of the captured or replicated event data in real time or near real time. Specifically, the technology event processing module 250 comprises a technology data logging application 255, an event standardization module 260, a charting module 265, a dynamic event data evaluation application 270 and an indexing module 280, in operative communication with each other. The technology event processing module 250 is in operative communication with an off-disk database 290 comprising a native format event database 292 and an event data payload 294. In some embodiments, the off-disk database 290 is associated with the data storage 152 of the technology event processing system 108, to ensure the security and safety of the processed event data. In other embodiments, at least a portion of the off-disk database 290 may be associated with external systems or external databases, such as the entity server 106, the technology server 105, and the like. In some embodiments, the off-disk database employs data storage virtualization for the processed event data, such as block virtualization, file virtualization and the like. In some embodiments, the off-disk database 290 is a virtual tape. In some embodiments, the off-disk database 290 is a virtual tape library (VTL) with a physical storage component such as hard disk storage, although tape drives may also be employed. Here, in some instances, the VTL comprises Serial Attached SCSI (SAS) or Serial AT Attachment (SATA) disk arrays as the storage component. These array enclosures enhance the scalability of the off-disk database 290, because the storage capacity may be increased by merely adding additional disk drives and enclosures.

The technology data logging application 255 is configured to receive the captured processed event data from the proctor queue memory locations (235, 245, . . . ) and assign unique processing event identifiers to each captured event and log the indexed event data to an event index memory location 282 of the indexing module 280. In some embodiments, the technology data logging application 255 is configured to store indexed captured event data records in the native format event database 292, such that the associated attribute data is stored in the native format that it was captured in. Typically, the event data is stored as event records such that each captured event is associated with an event record, wherein each event data record is stored at a specific memory location address in the database 292. Furthermore, in some embodiments, the assigned unique processing event identifier is stored in a predetermined identifier field of the event record in the database 292, while the captured attribute data is typically stored in one or more fields of the event record in its native format. In some instances, the native format event database 292 comprises two dimensional arrays, multidimensional arrays, relational databases and the like, that are configured to store the indexed captured event data records. In some instances, the native format event database 292 comprises a structure similar to that described with respect to the off-disk database 290.

The technology data logging application 255 is further configured to store an index of the event data stored in the native format event database 292. In this regard, for each captured processing event record, the assigned unique processing event identifier and the memory location address of the event data stored in native format at database 292, are correlated and stored in the event index memory location 282. As such, in some instances, the event index memory location 282 comprises one or more logs or indices, each index comprising a unique processing event identifier and a memory location address indicating the storage location of the data. As such, the event index memory location 282 comprises two dimensional arrays, multidimensional arrays, relational databases or the like.

The event standardization module 260 is configured to transform the captured event data into a predetermined format for further analysis. As such, the format of the technology event data records in the received electronic files may vary from one file to another, within the records of the same file, and/or within data attributes of a single record. As discussed previously, format, programing language, syntax and/or attributes, of the event records are successively modified by the technology platform applications, associated components or associated users. Therefore, at least a portion of the captured processed event data of certain event record from a first proctor module associated with modifications performed by a first technology platform application, is often distinct and unalike the captured processed event data of the same record from a third proctor module associated with modification by a third technology application, downstream of the first application. The event standardization module 260 is configured to transform the captured event data received from the technology data logging application 255 to a predetermined standard format, standard programming language and standard syntax and structure. This standardization enables mapping of event records described in detail elsewhere in this disclosure.

The charting module 265 is configured to map the captured processing event records with upstream and downstream processing event records for the each origination event record received at the technology platform application 205. In this way, the charting module 265 is configure to construct mapped event metadata, reflecting the course of the various processing events performed by the technology platform application and the associated modifications in the record data. Furthermore, the charting module 265 is configured to write, for each event record, the transformed/ standardized mapped event data comprising various processing event data records associated with various stages of processing on the mapped event data payload 294, in a manner similar to that described with respect to the database 292. Specifically, the charting module 265 is configured to store each of the transformed/standardized event data records at specific memory location addresses. The mapped event data payload 294 typically stored the standardized paired event data in a predetermined file format. For instance, this predetermined file format may be a file under folder (FUF) format. In some embodiments, the mapped event data payload 294 comprises a distributed storage framework, such as a Distributed File System (DFS). In addition, the charting module 265 is configured to log the mapped event metadata to an index in the matching index memory location 284 of the indexing module. In this regard, the matching index memory location 284 may correlate the memory location addresses of processing event data records stored in the mapped event data payload 294, that are related to the processing of a single origination technology event record. These features are described in detail with respect to FIG. 4 elsewhere in this disclosure. The dynamic event data evaluation application 270 is configured to dynamically compare multi-attribute mapped originated technology data and processed event data, as will be described in detail later on.

As discussed previously, in some embodiments, computer readable instructions 154, when executed by the processing device 148, are typically configured to cause the technology platform applications, proctor modules, technology data logging application 255, event standardization module 260, charting module 265, indexing module 280, dynamic event data evaluation application 270, and other components of the technology platform module environment 200 to perform one or more functions as described herein.

FIG. 3 illustrates a process map 300 for processing of electronic data files, in accordance with some embodiments of the invention. As discussed previously, multiple technology platform applications typically process technology event records in received electronic file, by performing a series of discrete processing events. As illustrated at step 305, a first or origination technology platform application, such as application 205, receives one or more technology event data files or electronic data files for processing. This data file is typically received at the technology event processing system 108, from the user device 104, entity server 106 and the like. For example, the system 108 may receive one or more electronic files (for example, files associated with electronic product orders, payment processing and the like) for processing, each file comprising one or more technology event records (for example, technology event records associated with a resource transfer activity of executing a shipment order, a payment transfer, and the like), from a user 102, via a user interface of the user application 122 of the user device 104. The received electronic files are referred to as origination electronic files and the event records contained therein are referred to as origination event records. On receiving the electronic file for processing, the first or origination technology application typically analyzes the origination file, identifies and extracts the one or more origination event records contained within as discrete event records for processing. In this regard, in some embodiments, the received electronic file is fragmented into a plurality of discrete event records for data processing. The origination technology platform application then creates a first or origination transient data queue at a first transient memory location at step 310. Subsequently, the origination technology platform application places the extracted origination event records and the associated event data in the origination transient data queue.

In this regard, in some instances, the origination platform application performs a series of enqueue operations to place each origination event record, individually, on the origination data queue at step 310, such as the transient memory location 210. In some embodiments, placing the origination event records, individually, on the origination queue comprises modifying the event records. In this regard, the system 108, via the origination technology application, may augment each of the origination records with a timestamp, the name or identifier associated with the origination data file that the record was extracted from, the user or system that transmitted the origination file, and the like. Furthermore, in some embodiments, the origination technology platform application may analyze the origination event records and place them in the origination queue in a suitable order or succession based on a predetermined criteria such as timestamp, activity deadline, priority, format of the origination record, memory size, estimated completion time, estimated number of processing events to complete the technology activity and the like. In some instances, placing the transient event data on the queue is configured to cause the origination event records to be processed individually and the associated technology activities to be performed individually, separate from the origination electronic file and from one another. For example, a plurality of origination records placed in the origination transient data queue in a suitable order may comprise origination records extracted from two or more origination electronic files. In some instances, the origination transient data queue is a multi-level queue where the origination activity records are grouped into two or more sub-queues based on a suitable criteria such as format of the origination record, priority, data content of the predetermined attribute, and the like. In this regard, each sub-queue may be assigned a sub-queue processing priority. Furthermore, addition of event records to the origination transient data queue triggers, automatically, the associated proctor module for data replication, in real time, without requiring transmission of additional instructions.

In addition, placing the origination event records on the origination transient data queue is configured to trigger, automatically and in real time, a second technology platform application. The second technology platform application then extracts the origination event records from the origination transient data queue at step 315. This extraction is typically performed by a series of dequeue operations, using a suitable scheduling algorithm such as first in first out (FIFO), earliest deadline first (EDF), shortest job first (SJF), priority scheduling and the like. In the instances where the origination data queue is a multi-level queue, the second technology platform application may dequeue the origination records from sub-queues with higher processing priorities first and then by employing a suitable scheduling algorithm within the sub-queues, thereby ensuring optimal utilization of processing resources and reducing processing time, while ensuring that high priority records are processed first.

Next, the second technology platform application formats or transforms the retrieved origination event records. The second technology platform application further analyzes, for each event record, the event data to determine the next technology platform application, for example third technology platform application, that the record has to be routed to for the next processing event. In this regard, in some instances, the second technology platform application may perform the formatting operations and route a retrieved technology event record to the determined technology platform application, before dequeuing the next origination record from the origination data queue. Furthermore, in some embodiments, formatting the event record comprises transforming the technical language, syntax, attribute formatting, character set (for example, Binary Coded Decimal (BCD), ASCII, Unicode, Extended Binary Coded Decimal Interchange Code (EBCDIC), and the like), character encoding system of the data and the like into a predetermined standard format and/or into a predetermined format required for processing by the subsequent technology platform application. Furthermore, dequeuing an event record from a transient data queue, such as the origination data queue, typically results in the record being removed, overwritten or otherwise deleted from the queue, to ensure that only the most current processed version of the event record is available at a time. Therefore, the present invention provides a novel solution by implementing the proctor module to replicate the event record data before it is erased from the transient memory location when the record is transmitted for subsequent processing.

Routing the event record further comprises adding or enqueuing the processed event record to a second transient data queue associated with the subsequent technology platform application for further processing of the event record, as illustrated by step 320. As an example, the second technology platform application may route, sequentially, a first event record to a transient data queue associated with a third technology application, a second event record to a transient data queue associated with a fifth technology application, a third event record to a transient data queue associated with a fourth technology application, and so on until all the event records in true first/origination transient data queue have been dequeued, formatted and routed for their subsequent processing. Adding or enqueuing the processed event data to the second transient data queue is typically substantially similar to the process previously described with respect to step 310.

As illustrated by step 325, the subsequent technology processing application, such as a third technology platform application, then performs a dequeuing operation to retrieve the processed event record from the second transient data queue. This dequeuing operation is typically substantially similar to the retrieval operations described with respect to step 315. The third technology platform application then performs a first processing operation on the retrieved transient event data of the event record. This processing operation typically involves modification of the event record and the associated event data, for example by transforming, augmenting, truncating, formatting, and/or appending the event data and/or the associated attributed. As such, the contents, format, programing language, syntax, character encoding, character set and/or attributes, of the event records may modified during the first processing operation or processing event performed by the third technology platform application. In some instances, the modifications performed by the technology application may also comprise undesirable modifications due to processing errors or other inadvertent modifications due to the functioning of the platform application and/or associated middleware and other components. In some instances, the modifications may also comprise necessary data alterations performed by users/personnel for continued downstream processing and/or inadvertent alterations or errors by users that may be undesirable for, or that may hinder downstream processing of the records. After completion of the first processing operation or the processing event, the third technology platform application, typically determines the next application such as a fourth technology application that the processed event record has to be routed to for subsequent processing. Subsequently, the third technology platform application may add the processed event record to a third transient data queue associated with the fourth technology platform application, as illustrated by step 330. The processing operations then continue at steps 335, 340, 345, and so on, in a manner similar to the process described with respect to steps 315, 320, 325 and 330. In some embodiments, after completion of the various processing operations or processing events by the technology platform applications, the completely or partially processed event record may be transmitted to another system, such as the technology server 105.

As discussed previously, addition or enqueuing of the event record to a transient data queue is configured to trigger, automatically, an associated proctor application. As illustrated by step 360 of FIG. 3, a first proctor application is triggered, automatically, to capture the origination event record, comprising record data, attributes and the like, added to the origination transient data queue at step 310. Typically, this capture or replication occurs, in real-time, after the enqueuing operation and before the record is dequeued for downstream processing. Similarly, FIG. 3 also illustrates capture of processed event records from a fourth transient data queue by a second proctor application, at step 380. For each event record, the first proctor application captures the origination event record in its native state as it is added to the origination transient data queue, and a second proctor application captures the processed event record, in its native state, as it is added to the fourth transient data queue. Therefore, event data of the record as it was received in the origination file is captured, along with the modified event data after the requisite processing/modification of the event record by the fourth processing platform application at step 335 and processing at the preceding processing steps 312 and 325. Although, FIG. 3 illustrates proctor applications associated with the first and fourth transient data queues as an example, some or all of the other transient data queues (such as second and third transient data queues illustrated at steps 320 and 330) may also be associated with proctor applications for capture of processed event data at each step. In addition, in some embodiments, the proctor module comprises a single proctor application, which is configured to capture transient event records, in real time, as they are added to various transient data queues.

Subsequently, the proctor applications generate an event payload comprising captured transient record data, as illustrated by steps 370 and 390. Specifically, the first proctor application, such as proctor module 230, is configured to construct a first proctor queue, such as at memory location 235, comprising the captured origination records, at step 370. As such, the first proctor application is configured to capture the origination event record data in the origination transient data queue, in real-time, and store the replicated data in the associated first proctor queue, for example, by using an enqueue operation. Similarly, the second proctor application is configured to capture the processed event record data in the fourth transient data queue, in real-time, and store or add the replicated/captured data to an associated second proctor queue, as illustrated by step 390. In the instances where there are additional proctor applications, each of the additional proctor applications are also typically configured to add the captured event records to associated proctor queues. In some embodiments, the proctor queues are similar to the transient data queues in structure and operation. Typically, addition of the captured event data to a proctor queue is configured to trigger, automatically and in real time, multi-attribute event data transformation, processing evaluation and data mapping by the technology event processing module 250, as indicated by step 400. The multi-attribute event data transformation, processing evaluation and data mapping process performed by the processing module 250, will be described in detail elsewhere in this disclosure, with respect to the process map 400 illustrated by FIG. 4.

As an illustrative example, the processing of the electronic files will now be described in the context of processing electronic files comprising resource transfer or financial activity data, such as a payment file for an organization. At step 305, the first or origination technology platform application, such as application 205, receives one or more technology event data files or electronic data files, comprising financial activity data, for processing. Here, each electronic data file may comprise multiple technology event records (for example, hundreds, thousands or tens of thousands of records), with each technology event record being associated with an electronic activity comprising a financial activity/transaction such as a resource transfer, also referred to as a payment transfer. Furthermore, each record may comprise one or more technology attributes associated with type of activity or transaction (for example, debit, credit, resource transfer), instructions for processing the record (for example, type of processing), technology resources involved (for example, initiating resource/financial institution, receiving resource or financial institution, intermediate resource systems, domestic systems, international systems), technology platforms applications involved (for example, technology data processing applications, regulatory applications, internal applications), information associated with the users/entities/systems involved (for example, initiating or first user name, first user account identifiers, receiving or second user name, second user account identifiers), activity attributes (for example, resource quantity/amount, inbound and outbound currency), timestamp, and/or other aspects. In some embodiments, the financial activity records in the electronic files relate to payment processing requests (also referred to as resource transfer activates), with each record comprising financial activity data required for completing the payment processing activity. The payment processing activity may comprise a payment transfer or resource transfer from a first account associated with a first user/entity at a first location to another second account, typically associated with a second individual/entity at the same or different location (for example, a different country).

On receiving the origination electronic file for processing, the first or origination technology application typically analyzes the origination file, identifies and extracts the one or more origination financial activity records contained within and places the extracted origination event financial activity records and the associated event data in the origination transient data queue at step 310. Typically, the first technology application is an activity origination application, configured for creation, submission and logging of an online or file-based payment transfer request and associated attribute data. Next, the second technology platform application, such as middleware, extracts the origination financial activity records from the origination transient data queue at step 315. Subsequently, the second technology platform application formats the retrieved origination financial activity records and determines the next technology platform application, for example the third technology platform application, associated with the next processing event. The second application may then route the financial activity record to the second transient data queue associated with the subsequent technology platform application for further processing of the event record, as illustrated by step 320.

As discussed previously, the processing operations then continue at steps 325, 330 335, 340, 345, and so on, to complete the financial activity, for example resource transfer or payment transfer. The various technology platform applications associated with the processing operations/events at steps 325, 335, 345 and so on, may comprise a pre-processing activity request routing and formatting application, an activity request workflow initiation application, a post processing activity request routing and formatting application, a data integrity or sanctions checking application, activity accounting application, and the like. Two or more of these technology platform applications may be employed, typically, in sequence to processes the activity records associated with the electronic files. The pre-processing activity request routing and formatting application is typically configured for middleware based movement and formatting of payment origination request data, such that each payment request is prepared and forwarded to the correct processing platform for workflow orchestration and successful completion of the payment request. Furthermore, the activity request workflow initiation application is typically configured to for initiation of programmed workflow. The programmed workflow is configured to successfully auto-orchestrate the payment through the various steps that are required for the successful completion of a payment request or resource transfer request. The post processing activity request routing and formatting application is configured for middleware based movement and formatting of payment origination request data that ensures that each payment request is correctly prepared and forwarded to the data integrity checking application. The system is configured to transmit the processed technology event record/data to an internal/external data integrity checking application, for example, after determining that the contents of the processing record have not been altered/modified at block 608 described later on with respect to FIG. 6. In some instances, the system is further configured to initiate the resource transfer or payment transfer activity based on receiving an indication of a successful integrity check of the processed record.

Initiation of the resource transfer or payment transfer comprises, in some instances, transmitting the processed event records to one or more internal, one or more external (such as entity server 106) or third party systems and applications (such as technology server 105) such as other financial institution applications, financial services applications, clearing house applications, governmental applications, payment networks and other electronic funds transfer applications, for completion of the payment transfer or resource transfer activity. In this regard, these applications may perform one or more of data integrity checking, clearing, foreign exchange, debiting/crediting, settlement operations to complete the resource/payment transfer activity.

Other technology platform applications may comprise a payment settlement application, payment data transformation application, payment clearing application, and the like. Addition or enqueuing of the event record to a transient data queue by the platform applications is configured to trigger, automatically, an associated proctor application as described previously.

FIG. 4 illustrates a process map 400 for multi-attribute event data transformation, processing evaluation and data mapping process, typically performed by the technology event processing module 250. As illustrated by step 405, the technology data logging application 255 is configured to retrieve processing event data from the proctor queues, often in real time as they are enqueued at the proctor queue memory locations. Typically, the technology data logging application 255 assigns a unique processing event identifier to each retrieved event record. Next, as illustrated by step 410, for each event record, the technology data logging application typically logs the event metadata to an index of the event index memory location 282. Here, in some embodiments, the event record is augmented to store the assigned unique processing event identifier in a predetermined identifier field. As such, in some instances, the event index memory location 282 comprises one or more logs or indices, each index comprising a unique processing event identifier and accompanying event record metadata, for example in distinct fields.

As discussed previously, each event record comprises a plurality of attributes or fields of event data associated with various facets of the event records and associated technology activity. Since the event record is often transmitted to the associated entity after processing and completion of the associated technology event, the origination event record often comprises data attributes that may be required by the entity for post-completion analysis, record and report creation and post-completion routing. For instance, an event record often comprises 1000-2000 attributes or fields of event data. In some embodiments, the technology data logging application 255 is configured to store indexed captured event data record in its entirety in the native format event database 292, such that the associated attribute data is stored in the native format that it was captured in, as indicated by step 415. In addition, in some instances, the technology data logging application 255 logs the event record to an index comprising the assigned unique processing event identifier and accompanying event record metadata comprising a predetermined portion of the event record attributes. In some instances, the predetermined portion of event record attributes ate received from the user. In some instances, metadata and/or the predetermined portion of record attributes comprises record attributes that are least likely to be modified in the course of processing of the technology event records. Here, in some instances, the technology data logging application may determine the portion of the record attributes that are typically required or necessary for execution of event data processing steps and/or completion of the technology activity. Modification of data contained in such attributes may hinder the processing of the record itself at the technology platform applications, or even the completion of the associated technology activity, and therefore such attributes are least likely to be modified. Therefore, the system may log this portion of data attributes, i.e., the data contents of the portion of attributes as metadata. For instance, the technology data logging application may identify 10 record attributes fields out of 2000 total attributes of the record, and log them as the event metadata.

Next, the event standardization module 260 is configured to transform the captured event data into a predetermined format, as illustrated by step 420. The event standardization module 260 is configured to transform the captured event data received from the technology data logging application 255 to a predetermined standard format, standard programming language and standard syntax and structure. In some embodiments, the standardization module transforms only a portion of the event data, such as the event metadata. Next, the event standardization module is configured to establish index entries into event matching tables and construct composite indices based on event attributes. Typically, these composite indices are constructed based on the event record metadata and the index entries are stored as a record of a matching table in the matching index memory location 284.

The charting module 265 is configured to map the captured processing event records with upstream and downstream processing event records for the each origination event record received at the technology platform application 205. Specifically, for each standardized event record, the charting module is configured to analyze the event data to determine the processing event type at step 425. In this regard, the system may analyze predetermined portions of the event record, for example event metadata to determine whether the even record is an origination event record or a processing event record (also referred to as a processed event record) that has been processed by one or more technology platform applications. Based on determining that the event record is an origination event record, the system then automatically, assigns a unique activity identifier to the origination record, at step 430. The unique activity identifier assigned to origination event records may be different from or similar to the unique event identifier assigned to the records in retrieval from the proctor module. Based on determining that the event record is a processing or processed event record, the system proceeds to analyze the processing event record. Consequently, at step 435, the system/charting module matches each processing event record to an origination event record identified at step 430. The technical process of matching the records is described in detail with respect to FIG. 5 elsewhere in this disclosure.

As discussed previously, a single origination record may undergo a plurality of processing operations at the technology platform applications resulting in a plurality of processing records associated with the single origination record. Hence, each processing event record is mapped to only one origination event record. Next, the system assigns the unique activity identifier of the mapped origination event record to the processing event record at step 440. In this regard, in some embodiments, assigning the unique activity identifier of the mapped origination event record comprises augmenting the processing event record to include the unique activity identifier of the mapped origination event record, for example by creating a new attribute or field with the data. Typically, the unique activity identifier enables tracking of the processing of the origination event record through processing by the plurality of technology applications and determining if the record data has been modified in the course of the processing.

In this way, the charting module 265 is configured to construct mapped event records, reflecting the course of the various processing events performed by the technology platform application and the associated modifications in the record data. Furthermore, the charting module 265 is configured to write, for each mapped event record, the transformed/standardized event data of the mapped/matched records on the mapped event data payload 294 of the off-disk storage database 290, in a manner similar to that described with respect to the database 292. Here, the charting module 265 typically writes all of the plurality of attributes of the event records to the off-disk storage. In addition, the charting module 265 is configured to log the mapped event metadata to an index in the matching index memory location 284 of the indexing module, as indicated at step 450. Consequently, the dynamic event data evaluation application is configured to dynamically compare multi-attribute mapped event records to determine if any modifications to the event data were performed in the course of data processing, at step 460, as will be described with respect to FIG. 6.

FIG. 5, illustrates a high level process flow 500 for mapping of processing event record with the origination event records, at the charting module 265. Conventional processing methods typically match files or documents by reading and matching the data contained within. For example, by comparing the text or contents of two files, typically character by character. However, such comparisons of bulky files while being intensely time consuming, also devour large amount of processing and memory resources. Typically, each technology event record undergoes about 40 processing operations and is processed within about 1-2 seconds. However, implementing string comparison each attribute data of record data of a particular origination event record containing thousands of attributes, with corresponding attribute data of 40 versions each of processed event records of tens of thousands of captured records, infinitely compounds time and processing drawbacks of conventional comparison methods, if not rendering such a process infeasible.

Another crucial drawback of conventional comparison methods is that, they simply fail to match event records whose data has been modified in the course of processing. As discussed previously, processing operations by the technology platform applications involve modification of the origination event record and the associated event data. For example contents, format, programing language, syntax and/or attributes, of the origination event records may successively modified during the processing operations/events performed by the technology applications, and such modifications may be desired to be identified and analyzed. Furthermore, the technology platform applications operate on different mainframe, processing language configurations and distinct character sets. For example, the received electronic data file may be associated with an XML (Extensible Markup Language) format and may comprise an origination event record in the XML format. The extracted event record added to, and captured by the proctor module from the transient queue would be present in the XML format. The subsequent technology platform application may be associated with an EBCDIC (Extended Binary Coded Decimal Interchange Code) format and may transform the origination event record to the EBCDIC format for the processing operation. The processed event record added to, and captured by the proctor module from the transient queue would be present in the EBCDIC format. Because the character sets, syntax and formats of XML are distinct from EBCDIC, conventional comparison methods fail to match the origination event record with the processed event record even if the content of the records remains unchanged, much less matching the records when the contents of the event data is modified/altered.

The novel processing method and architecture described in the high level process flow 500, alleviates the aforementioned concerns and provides a novel architecture that is configured to match origination event data records with their processed event counterparts with same or different formats, even if the contents of the event data have been modified, in real time or near real time, and without requiring large capacities of processing and memory resources. Specifically, at block 502, the technology data logging application 255, determines the event metadata. The application 255, typically identifies the metadata for all of the captured event records as they are received from the proctor queues. As discussed previously, the metadata typically comprises the predetermined portion of the plurality of technology attributes, for example attributes that are least likely to be modified during the sequential processing of the technology event records by the plurality of technology applications. For instance, the system may determine that data contained in certain attributes, for example about ten attributes of a total of thousand attributes, is necessary to be present in its origination state for the processing to have occurred, and therefore unlikely to have been modified. In some instances, the identified portion of attributes of the technology event record, i.e., the specific attributes, remain the same for all of the technology event records, while in other instances, the portion may vary from one origination technology event record (and its counterpart processed records) to another. As discussed earlier, this metadata is indexed in the event index memory location 282 along with the unique processing event identifier, for each captured event record (either origination or processing record).

Next, the event standardization module 260 typically transforms the each of the plurality of captured technology event records to a standard format, as indicated by block 504. This standardization ensures that all of the captured records have the same format, syntax, character set and the like. In this regard, in some instances the event standardization module 260 transforms/standardizes only the metadata in the records, while in other embodiments, the event standardization module 260 transforms/standardizes each of the plurality of attributes for each captured record. Here, the system may match the metadata of a particular processed event record, identified at step 425, to the metadata of identified origination event records to determine a match.

As illustrated by block 506, the system is then configured to determine, for each of the plurality of standardized technology event records, a digital indicator for the metadata associated with the technology event record. In some embodiments, the digital indicator is a digital fingerprint that is typically common to the metadata of a particular origination record and its counterpart processed event record. In some embodiments, the determining the digital indicator comprises producing a hash value for the metadata using a hash function of the charting module 265. Typically, a hash value is a fixed length identifier (such as, a numeric value of a fixed length) that uniquely identifies data. Hash values often uniquely represent large amounts of data, as much smaller numeric values. In some instances, locality-sensitive hashing (LSH) may be employed to reduce the dimensionality of the record attributes in the metadata. In other embodiments, the digital indicators comprise checksums, check digits, randomization functions, and the like. In some instances, the has values are configured and assigned, globally, over a variety of character encoding systems and character sets such that, the digital indicators may be matched without requiring data standardization. For example, a character or string may be assigned a same value for each of its representations in multiple character sets so that the character or string would have the same digital indicator irrespective of the format, thereby precluding the data transformation step at block 504, and hence, further reducing the processing time and memory requirements.

Next, as illustrated by block 508, the charting module 265, matches the processed event record to the associated origination event record based on at least determining that the digital indicator of the origination event record matches the digital indicator of the processed event record. For example, after identifying a processed event record at step 425, the charting module 265 typically compares the digital indicator of the processed event record with the determined digital indicators of identified origination event records, to identify a match. Therefore, the charting module 265 is configured to match the event records, in a timely and efficient manner. Furthermore, because the matching is conducted based on the metadata, any modifications to the rest of the attributes would not impact the record mapping/charting.

FIG. 6, illustrates a high level process flow 600 for dynamically comparing multi-attribute record data and evaluating the processing of the data, at the dynamic event data evaluation application 270. As illustrated by block 602, the dynamic event data evaluation application 270 receives a request or an indication to determine whether a first technology event record was modified during the sequential processing of the technology event records by the plurality of technology applications. The request or indication typically comprises one or more record parameters such as a portion of metadata or data associated with one or more attributes of the first record. In this regard, in some instances, the request is received from a user 102 via the user application 122 of the user device 104. In some instances, the request is received from an external system such as the entity server 106. In some instances, the request is received from downstream systems or entities, such as the technology server 105. Here, the technology server 105 may transmit the indication, via the network 101, for example, to verify the integrity of the event record retrieved from a transient data queue, or when the received event record comprises errors that hinder downstream processing. In other instances, the indication may be received internally from a technology platform application or automatically triggered by placement of the processed record in the final transient queue, to verify the integrity of the processed record before transmitting it to an external entity for further processing, such as the technology server 105.

Next, the dynamic event data evaluation application 270, retrieves mapped logged event metadata and the unique activity identifier associated with the first record and corresponding mapped records from the matching index memory location 284 of the indexing module 280, based on comparing the received record parameters with the indexed metadata, at block 604. Subsequently, at block 606, and based on the retrieved unique identifier of the first record, the dynamic event data evaluation application 270 retrieves the mapped origination event record and processed event record from the mapped event data location 294 of the off-disk storage 290. Here, the retrieved event records comprises each of the plurality of attributes associated with the records in their entirety, which were previously transformed to a standard form. Next, the dynamic event data evaluation application 270, compares each of the technology attributes of the origination event record to the attributes of the processed event record to determine any modification to technology attribute data, as indicated by block 608. In the case on identifying modification in at least one attribute data of the processed event record, the application may further identify the technology platform application, middleware, other components, and/or users associated with the modification. In some instances, identifying the modification triggers, automatically, corrective action. In addition, as indicated by block 610, the dynamic event data evaluation application 270 is configured to generate, automatically, processing reports associated with the comparison results. These reports may comprise the content of the retrieved matched records, one or more visual elements such as maps, charts and graphs, that are displayed on the user device display.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| 15/288,779 now U.S. Pat No. 10,067,994 | REAL TIME EVENT CAPTURE AND TRANSFORMATION OF TRANSIENT DATA FOR AN INFORMATION NETWORK | Concurrently herewith |
| 15/288,835 now U.S. Pat No. 10,069,672 | REAL TIME EVENT CAPTURE, ANALYSIS AND REPORTING SYSTEM | Concurrently herewith |

The invention claimed is:

1. A system for real time event capture and analysis of transient data for an information network, wherein the system is configured to enable technology event data transformation, processing evaluation and data mapping, the system comprising:

a plurality of technology platform applications comprising an origination platform application and a processing platform application, wherein the origination platform application is associated with a first transient memory location configured to temporarily store data until the data is retrieved by the processing platform application, wherein the processing platform application is associated with a second transient memory location;

a first proctor module application in operative communication with the first transient memory location, wherein the first proctor module application is configured to capture, in real time, transient data stored in the first transient memory location before the data is retrieved by the processing platform application;

a second proctor module application in operative communication with the second transient memory location, wherein the second proctor module application is configured to capture, in real time, transient data stored in the second transient memory location;

at least one memory device with computer-readable program code stored thereon;

at least one communication device;

at least one processing device operatively coupled to the plurality of technology platform applications, the first proctor module application and the second proctor module application, the at least one memory device and the at least one communication device, wherein executing the computer-readable code is configured to cause the at least one processing device to:

receive, at a charting module, a plurality of captured technology event records, wherein each captured technology event record comprises a plurality of technology attributes, wherein the plurality of captured technology event records comprise a plurality of origination technology event records captured by the first proctor module from the first transient memory location, and a plurality of processed technology event records captured by the second proctor module from the second transient memory location;

determine, for each of the plurality of captured technology event records, event metadata, wherein the event metadata comprises predetermined portion of the plurality of technology attributes;

determine, for a captured first event record of the plurality of captured event records, a processing event type, wherein the processing event type comprises an origination event record type or a processed event record type, wherein the plurality of origination technology event records are associated with the origination event record type, wherein the plurality of processed technology event records are associated with the processed event record type;

based on determining that the captured first technology event record is an origination event record type, assign a unique activity identifier to the captured first origination technology event record;

determine, for a captured second event record of the plurality of captured event records, the processing event type, wherein determining further comprise determining that the captured second technology event record is the processed event record type;

match the captured second technology event record to the captured first technology event record, based on determining that the event metadata of the captured first technology event record matches the event metadata of the captured second technology event record; and assign the unique activity identifier of the captured first technology event record to the captured second technology event record.

2. The system of claim 1, wherein executing the computer-readable code is configured to further cause the at least one processing device to transform the plurality of technology attributes associated with each of the plurality of the captured technology event records to a standard format, using an event standardization module.

3. The system of claim 1, wherein determining that the event metadata of the captured first technology event record matches the event metadata of the captured second technology event record further comprises:

transforming, the plurality of technology attributes associated with the captured first technology record and the captured second technology record, to a standard format using an event standardization module;

determining, for each of the captured first technology event and the captured second technology event, a digital indicator for the event metadata associated with the technology event record; and matching the captured second technology event record to the captured first technology event record based on at least determining that the digital indicator of the captured first technology event record matches the digital indicator of the captured second technology event record.

4. The system of claim 3, wherein determining the digital indicator for the event metadata comprises producing hash values of the event metadata using a hash function.

5. The system of claim 1, wherein mapping the captured first technology event record to the captured second technology event record further comprises:

logging, for each of the matched first technology event record and second processed technology event record, the event metadata and the unique activity identifier associated with the mapped first technology event record and the second technology event record to a matching index memory location of an indexing module.

6. The system of claim 1, wherein executing the computer-readable code is configured to further cause the at least one processing device to:

write matched first technology event record and second processed technology event record comprising the plurality of technology attributes to a mapped event data location of an off-disk storage;

wherein the off-disk storage comprises a virtual tape.

7. The system of claim 5, wherein executing the computer-readable code is configured to further cause the at least one processing device to:

receive, at a dynamic event data evaluation application, a request to determine whether the first technology event record was modified during the processing of the first processed technology event record by the first processing platform application;

retrieve the logged event metadata and the unique activity identifier associated with the mapped first technology event record and the second technology event record, from the matching index memory location of the indexing module;

retrieve the matched first technology event record and second processed technology event record from a mapped event data location of an off-disk storage, wherein the retrieved event records comprises retrieving the plurality of technology attributes associated with the with the mapped first technology event record and second processed technology event record, from the off-disk storage; and compare each of the technology attributes of the mapped first technology event record to the technology attributes of the second processed technology event record to determine any modification to technology attribute data.

8. A computer program product for real time event capture and analysis of transient data for an information network, wherein the computer program product is configured to enable technology event data transformation, processing evaluation and data mapping, the computer program product comprising a non-transitory computer-readable storage medium having computer-executable instructions to:

receive, at a charting module, a plurality of captured technology event records, wherein each captured technology event record comprises a plurality of technology attributes, wherein the plurality of captured technology event records comprise a plurality of origination technology event records captured by a first proctor module from a first transient memory location associated with an origination platform application, and a plurality of processed technology event records captured by a second proctor module from a second transient memory location associated with a processing platform application;

determine, for each of the plurality of captured technology event records, event metadata, wherein the event metadata comprises predetermined portion of the plurality of technology attributes;

determine, for a captured first event record of the plurality of captured event records, a processing event type, wherein the processing event type comprises an origination event record type or a processed event record type, wherein the plurality of origination technology event records are associated with the origination event record type, wherein the plurality of processed technology event records are associated with the processed event record type;

based on determining that the captured first technology event record is an origination event record type, assign a unique activity identifier to the captured first origination technology event record;

determine, for a captured second event record of the plurality of captured event records, the processing event type, wherein determining further comprise determining that the captured second technology event record is the processed event record type;

match the captured second technology event record to the captured first technology event record, based on determining that the event metadata of the captured first technology event record matches the event metadata of the captured second technology event record; and assign the unique activity identifier of the captured first technology event record to the captured second technology event record.

9. The computer program product of claim 8, wherein the non-transitory computer-readable storage medium further comprises computer-executable instructions to transform the plurality of technology attributes associated with each of the plurality of the captured technology event records to a standard format, using an event standardization module.

10. The computer program product of claim 8, wherein determining that the event metadata of the captured first technology event record matches the event metadata of the captured second technology event record further comprises:
   transforming, the plurality of technology attributes associated with the captured first technology record and the captured second technology record, to a standard format using an event standardization module;
   determining, for each of the captured first technology event and the captured second technology event, a digital indicator for the event metadata associated with the technology event record; and
   matching the captured second technology event record to the captured first technology event record based on at least determining that the digital indicator of the captured first technology event record matches the digital indicator of the captured second technology event record.

11. The computer program product of claim 10, wherein determining the digital indicator for the event metadata comprises producing hash values of the event metadata using a hash function.

12. The computer program product of claim 8, wherein mapping the captured first technology event record to the captured second technology event record further comprises:
   logging, for each of the matched first technology event record and second processed technology event record, the event metadata and the unique activity identifier associated with the mapped first technology event record and the second technology event record to a matching index memory location of an indexing module.

13. The computer program product of claim 8, wherein the non-transitory computer-readable storage medium further comprises computer-executable instructions to:
   write matched first technology event record and second processed technology event record comprising the plurality of technology attributes to a mapped event data location of an off-disk storage;
   wherein the off-disk storage comprises a virtual tape.

14. The computer program product of claim 13, wherein the non-transitory computer-readable storage medium further comprises computer-executable instructions to:
   receive, at a dynamic event data evaluation application, a request to determine whether the first technology event record was modified during the processing of the first processed technology event record by the first processing platform application;
   retrieve the logged event metadata and the unique activity identifier associated with the mapped first technology event record and the second technology event record, from the matching index memory location of the indexing module;
   retrieve the matched first technology event record and second processed technology event record from a mapped event data location of an off-disk storage, wherein the retrieved event records comprises retrieving the plurality of technology attributes associated with the with the mapped first technology event record and second processed technology event record, from the off-disk storage; and
   compare each of the technology attributes of the mapped first technology event record to the technology attributes of the second processed technology event record to determine any modification to technology attribute data.

15. A computer implemented method for real time event capture and analysis of transient data for an information network, wherein the computer implemented method is configured to enable technology event data transformation, processing evaluation and data mapping, the computer implemented method comprising:
   receiving, at a charting module, a plurality of captured technology event records, wherein each captured technology event record comprises a plurality of technology attributes, wherein the plurality of captured technology event records comprise a plurality of origination technology event records captured by a first proctor module from a first transient memory location associated with an origination platform application, and a plurality of processed technology event records captured by a second proctor module from a second transient memory location associated with a processing platform application;
   determining, for each of the plurality of captured technology event records, event metadata, wherein the event metadata comprises predetermined portion of the plurality of technology attributes;
   determining, for a captured first event record of the plurality of captured event records, a processing event type, wherein the processing event type comprises an origination event record type or a processed event record type, wherein the plurality of origination technology event records are associated with the origination event record type, wherein the plurality of processed technology event records are associated with the processed event record type;
   based on determining that the captured first technology event record is an origination event record type, assigning a unique activity identifier to the captured first origination technology event record;
   determining, for a captured second event record of the plurality of captured event records, the processing event type, wherein determining further comprise determining that the captured second technology event record is the processed event record type;

matching the captured second technology event record to the captured first technology event record, based on determining that the event metadata of the captured first technology event record matches the event metadata of the captured second technology event record; and assigning the unique activity identifier of the captured first technology event record to the captured second technology event record.

16. The computer implemented method of claim 15, wherein determining that the event metadata of the captured first technology event record matches the event metadata of the captured second technology event record further comprises:

transforming, the plurality of technology attributes associated with the captured first technology record and the captured second technology record, to a standard format using an event standardization module;

determining, for each of the captured first technology event and the captured second technology event, a digital indicator for the event metadata associated with the technology event record; and matching the captured second technology event record to the captured first technology event record based on at least determining that the digital indicator of the captured first technology event record matches the digital indicator of the captured second technology event record.

17. The computer implemented method of claim 16, wherein determining the digital indicator for the event metadata comprises producing hash values of the event metadata using a hash function.

18. The computer implemented method of claim 15, wherein mapping the captured first technology event record to the captured second technology event record further comprises:

logging, for each of the matched first technology event record and second processed technology event record, the event metadata and the unique activity identifier associated with the mapped first technology event record and the second technology event record to a matching index memory location of an indexing module.

19. The computer implemented method of claim 15, wherein the computer implemented method further comprises:

writing matched first technology event record and second processed technology event record comprising the plurality of technology attributes to a mapped event data location of an off-disk storage;

wherein the off-disk storage comprises a virtual tape.

20. The computer implemented method of claim 19, wherein the computer implemented method further comprises:

receiving, at a dynamic event data evaluation application, a request to determine whether the first technology event record was modified during the processing of the first processed technology event record by the first processing platform application;

retrieving the logged event metadata and the unique activity identifier associated with the mapped first technology event record and the second technology event record, from the matching index memory location of the indexing module;

retrieving the matched first technology event record and second processed technology event record from a mapped event data location of an off-disk storage, wherein the retrieved event records comprises retrieving the plurality of technology attributes associated with the with the mapped first technology event record and second processed technology event record, from the off-disk storage; and comparing each of the technology attributes of the mapped first technology event record to the technology attributes of the second processed technology event record to determine any modification to technology attribute data.

* * * * *